United States Patent
Lewis et al.

(10) Patent No.: US 11,166,085 B2
(45) Date of Patent: Nov. 2, 2021

(54) GENERATING MEDIA CONTENT PLAYLISTS INCLUDING INTERSTITIALS COMBINED WITH MEDIA CONTENT ITEMS

(71) Applicant: GOOGLE LLC, Mountain View, CA (US)

(72) Inventors: Justin Lewis, Marina del Rey, CA (US); Abhiram Kasina, San Bruno, CA (US)

(73) Assignee: Google LLC, Mountain View, CA (US)

( * ) Notice: Subject to any disclaimer, the term of this patent is extended or adjusted under 35 U.S.C. 154(b) by 65 days.

(21) Appl. No.: 16/607,695

(22) PCT Filed: Mar. 20, 2018

(86) PCT No.: PCT/US2018/023315
§ 371 (c)(1),
(2) Date: Oct. 23, 2019

(87) PCT Pub. No.: WO2018/200099
PCT Pub. Date: Nov. 1, 2018

(65) Prior Publication Data
US 2020/0137464 A1    Apr. 30, 2020

Related U.S. Application Data

(60) Provisional application No. 62/490,506, filed on Apr. 26, 2017.

(51) Int. Cl.
*H04N 21/845* (2011.01)
*G06F 16/438* (2019.01)
(Continued)

(52) U.S. Cl.
CPC ....... *H04N 21/8456* (2013.01); *G06F 16/433* (2019.01); *G06F 16/434* (2019.01);
(Continued)

(58) Field of Classification Search
None
See application file for complete search history.

(56) References Cited

U.S. PATENT DOCUMENTS 7,038,118 B1    5/2006 Gimarc
9,557,896 B1 *  1/2017 Toff ................. G06F 16/4387
(Continued)

OTHER PUBLICATIONS

KR Office Action for KR Patent Application No. 10-2019-7032355, dated Sep. 18, 2020, 11 pages.
(Continued)

*Primary Examiner* — Heather R Jones
(74) *Attorney, Agent, or Firm* — Lowenstein Sandler LLP

(57) ABSTRACT

A method includes identifying media content items for a playlist, each media content item has an introductory segment, main segment, and ending segment, determining a length of an ending segment of a first media content item and a length of an introductory segment of a second media content item, selecting an interstitial to be added to the playlist between a main segment of the first media content item and the second media content item. A length of the interstitial exceeds a combined length of the ending segment of the first media content item and the introductory segment of the second media content item. The method also includes adding a spacing between the ending segment and the introductory segment, and inserting the interstitial in the playlist between the main segment of the first media content item and the second media content item based on the spacing.

20 Claims, 12 Drawing Sheets

(51) Int. Cl.
*G06F 16/44* (2019.01)
*G06F 16/432* (2019.01)
*G06F 16/483* (2019.01)
*H04N 21/8545* (2011.01)

(52) U.S. Cl.
CPC .......... *G06F 16/4387* (2019.01); *G06F 16/44* (2019.01); *G06F 16/483* (2019.01); *H04N 21/845* (2013.01); *H04N 21/8455* (2013.01); *H04N 21/8545* (2013.01)

(56) References Cited

U.S. PATENT DOCUMENTS

2009/0300699 A1* 12/2009 Casagrande ....... H04N 21/4147
  725/116
2017/0099526 A1* 4/2017 Hua ................... H04N 21/2387

OTHER PUBLICATIONS

International Search Report and Written Opinion for Application No. PCT/US2018/023315, dated May 16, 2018, 13 pages.
Written Opinion of the International Preliminary Examining Authority for Application No. PCT/US2018/023315, dated Mar. 13, 2019, 6 pages.
International Preliminary Report on Patentability for Application No. PCT/US2018/023315, dated Jun. 13, 2019, 8 pages.
International Search Report and Written Opinion for Application No. PCT/US2018/023308, dated May 16, 2018, 11 pages.
Written Opinion of the International Preliminary Examining Authority for Application No. PCT/US2018/023308, dated Mar. 13, 2019, 7 pages.
International Preliminary Report on Patentability for Application No. PCT/US2018/023308, dated Oct. 29, 2019, 7 pages.

* cited by examiner

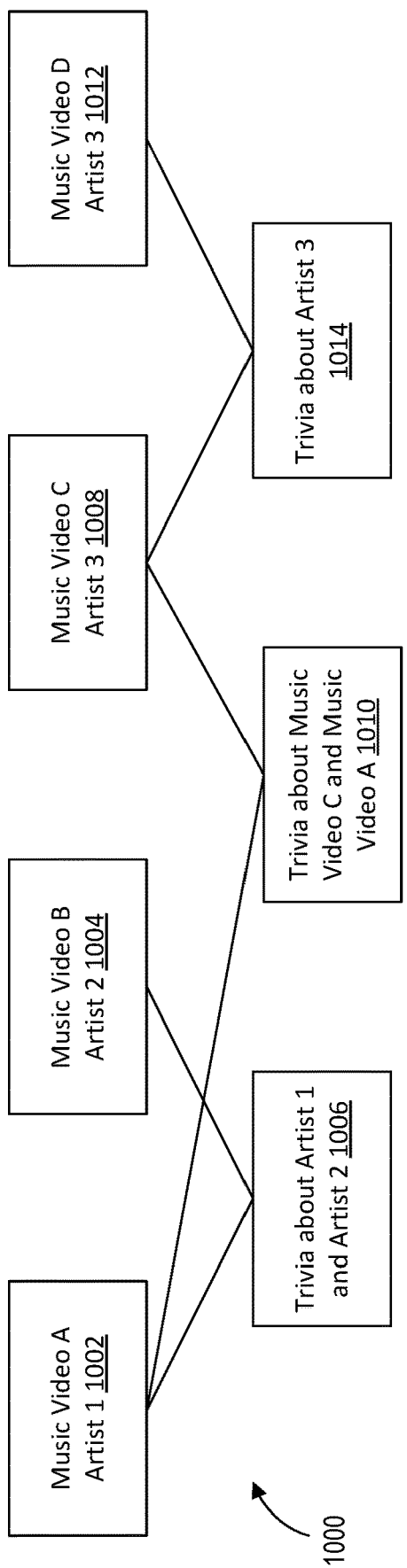
FIG. 10A
FIG. 10B

GENERATING MEDIA CONTENT PLAYLISTS INCLUDING INTERSTITIALS COMBINED WITH MEDIA CONTENT ITEMS

TECHNICAL FIELD

Aspects and implementations of the present disclosure relate to data processing, and more specifically, to generating media content playlists including interstitials.

BACKGROUND

Audio and video content can be stored on data servers and provided to users for listening/viewing over the Internet. Many social media platforms include a content sharing aspect that allows users to upload, view, and share content, such as video content, image content, audio content, text content, and so on (which may be collectively referred to as "media content items"). Such media content items may include audio clips, movie clips, TV clips, and music videos, as well as amateur content such as video blogging, short original videos, pictures, photos, other multimedia content, etc. Applications for supporting the listening/viewing of such media content items may be browser-based, or may run independently of a browser in a standalone application.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In some aspects of the disclosure, interstitials may be combined with introductory and ending segments of media content items in playlists. In one embodiment, interstitials may be inserted in between or overlapped with media content items during the ending segment of a first media content item currently playing and the introductory segment of a next media content item to be played. The timing of these interstitials and the lengths of the ending and introductory segments may be varied to produce a reduced amount of disruption to the user's viewing/listening experience. Further, in some embodiments, computing resources may be reduced by combining the interstitials with ending segments and introductory segments, as described further below.

According to one aspect of the present disclosure there is provided a method comprising: identifying a plurality of media content items for a playlist, each of the plurality of media content items having an introductory segment, one or more main segments, and an ending segment; determining a length of an ending segment of a first media content item of the plurality of media content items and a length of an introductory segment of a second media content item of the plurality of media content items; selecting an interstitial to be added to the playlist between one or more main segments of the first media content item and one or more main segments of the second media content item, wherein a length of the interstitial exceeds a combined length of the ending segment of the first media content item and the introductory segment of the second media content item; adding a spacing between the ending segment of the first media content item and the introductory segment of the second media content item; and inserting the interstitial in the playlist between the one or more main segments of the first media content item and the one or more main segments of the second media content item based on the spacing.

The inserted interstitial may overlap at least a portion of the ending segment of the first media content item and at least a portion of the introductory segment of the second media content item.

The spacing may be equal to a delta amount of time determined by subtracting the combined length of the ending segment of the first media content item and the introductory segment of the second media content item from the length of the interstitial.

The method may further comprise: determining that a length of a second interstitial is less than a combined length of an ending segment of the second media content item and an introductory segment of a third media content item of the plurality of media content items; and adjusting an overlap, with the second interstitial, of the ending segment of the second media content item and the introductory segment of the third media content item.

Adjusting the overlap, with the second interstitial, of the ending segment of the second media content item and the introductory segment of the third media content item may comprise: responsive to a determination that half of the length of the second interstitial exceeds the length of the introductory segment of the third media content item, overlapping, with the second interstitial, an initial portion of the ending segment of the second media content item and the entire introductory segment of the third media content item.

Adjusting the overlap, with the second interstitial, of the ending segment of the second media content item and the introductory segment of the third media content item may comprise: responsive to a determination that half of the length of the second interstitial exceeds the length of the ending segment of the second media content item, overlapping, with the second interstitial, the entire ending segment of the second media content item and an initial portion of the introductory segment of the third media content item.

Adjusting the overlap, with the second interstitial, of the ending segment of the second media content item and the introductory segment of the third media content item may comprise, overlapping, with the second interstitial, a first portion of the ending segment of the second media content item and a second portion of the introductory segment of the third media content item, the first portion of the ending segment of the second media content item and the second portion of the introductory segment of the third media content item having the same length.

Adjusting the overlap may comprise shrinking at least one of the ending segment of the second media content item or the introductory segment of the third media content item to equalize the combined length of the ending segment of the second media content item and the introductory segment of the third media content item with the length of the second interstitial.

Adjusting the overlap may comprise overlapping a portion of the ending segment of the second media content item with a portion of the introductory segment of the third media content item to equalize the combined length of the ending segment of the second media content item and the introductory segment of the third media content item with the length of the second interstitial.

The overlapping portion of the ending segment of the second media content item and the overlapping portion of the introductory segment of the third media content item may be faded in during playback.

The plurality of interstitials may comprise one or more of an announcement of the media content item that is playing next in the playlist, a notification of messages received while the first media content item played, and a trivia element that relates to both the first media content item and the second media content item.

The plurality of media content items may comprise audio and video.

The plurality of media content items in the playlist may be played in a first media player and the interstitial in the playlist may be played in a second media player proximate to the first media player.

According to another aspect of the present disclosure there is provided a non-transitory computer-readable storage medium including instructions that, when accessed by a processing device, cause the processing device to perform the methods described herein.

According to another aspect of the present disclosure there is provided a system, comprising: a memory device; a processing device operatively coupled to the memory device, the processing device to: identify a plurality of media content items for a playlist, each of the plurality of media content items having an introductory segment, one or more main segments, and an ending segment; determine a length of an ending segment of a first media content item of the plurality of media content items and a length of an introductory segment of a second media content item of the plurality of media content items; select an interstitial to be added to the playlist between one or more main segments of the first media content item and one or more main segments of the second media content item, wherein a length of the interstitial exceeds a combined length of the ending segment of the first media content item and the introductory segment of the second media content item; add a spacing between the ending segment of the first media content item and the introductory segment of the second media item; and insert the interstitial in the playlist between the one or more main segments of the first media content item and the one or more main segments of the second media content item based on the spacing.

The processing device may be further configured to: determine that the length of a second interstitial is less than a combined length of an ending segment of the second media content item and an introductory segment of a third media content item; and adjust an overlap, with the second interstitial, of the ending segment of the second media content item and the introductory segment of the third media content item.

BRIEF DESCRIPTION OF THE DRAWINGS

The present disclosure is illustrated by way of example, and not by way of limitation, in the figures of the accompanying drawings.

FIG. 10A depicts an example graph of media item pairs linked by an interstitial having one or more matching identifiers, according to an implementation.

FIG. 10B depicts an example resulting playlist from a traversal of the graph of FIG. 10A, the playlist including one pair of media content items intersected by one interstitial having one or more matching identifiers, according to an implementation.

DETAILED DESCRIPTION

Figure 1:
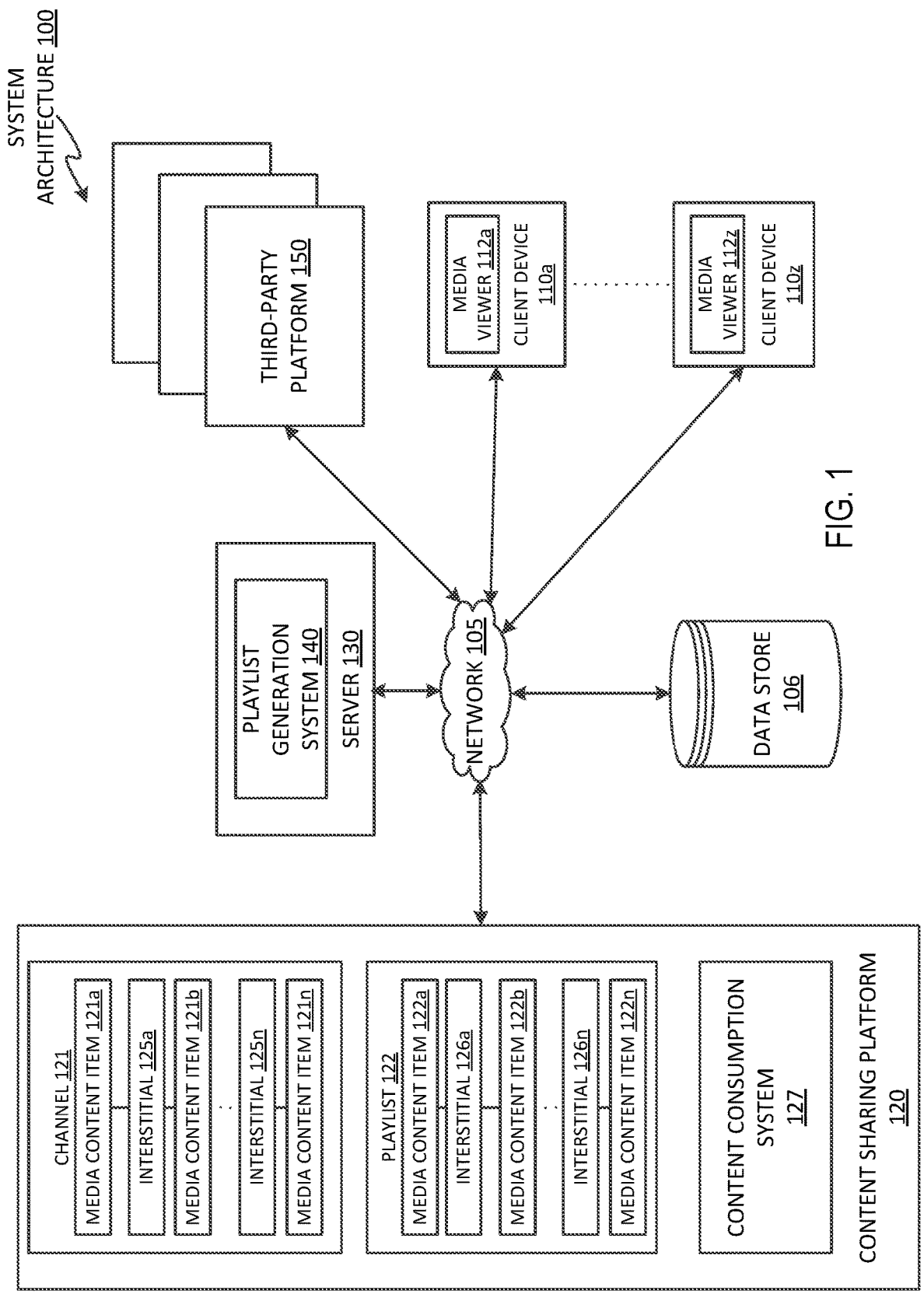
FIG. 1 is a block diagram illustrating an example network architecture, in accordance with one implementation of the present disclosure.

A content sharing platform may enable users to watch and/or listen to media content items. The media content items may include videos, audio (e.g., songs), images, and/or any other content that can be collected and/or disseminated via a content sharing platform. In some instances, a content sharing platform may provide a playlist (also referred to as streaming radio stations or radios) of the media content items. The playlist includes certain media content items to play for the user based on a selection by the user (e.g., a channel related to a genre, band, artist, etc.) and/or the preferences of the user (e.g., the media content items "liked" by the user, a number of times the user has played certain media content items, etc.), among other things. The content sharing platform may create the playlist and arrange the selected media content items in the playlist. In some scenarios, such as when the user is operating a vehicle, the playlist may be streamed in a background playback mode where the user just hears the audio and does not see a video (e.g., music video).

The content sharing platform may dynamically suggest new media content items to play in a playlist during a viewing/listening session as the user either "likes" or "dislikes" currently played media content items, skips media content items, or the like. The playlist may not have a fixed sorting at the time it is produced to be played. Any media content item that meets certain selection criteria may be pulled and added to the playlist. When the media viewer plays new unfamiliar media content items in a playlist, a jarring effect may be experienced by the user because there may not be an explicit content theme to the session. In some instances, the user may get confused about why the new media content item is being played. Since the user may just be listening to the media content item in the background playback mode, there may not be a user interface to display a reason for playing the new media content item.

Additionally, an interstitial (an additional media content item including video, audio, text, or the like) may be applied between the end of playback of a first media content item and the beginning of playback of the next media content item. This may be disruptive for the user's viewing/listening experience because the interstitial may be unrelated to the preceding or subsequent media item, and/or because, during the interstitial, video and/or audio may not be playing. As such, the user may receive a negative experience by having to wait for the interstitial to end before continuing to view/listen to a media content item.

Further, conventionally, a media content item, such as a music video, may include an introductory segment, one or more main segments, and an ending segment. For audio, the introductory segment and ending segment may include some background sound with no foreground elements, and the main segments may include at least foreground elements (e.g., singing). For example, the introductory segment may be several seconds long and include background instrumental audio that builds up to a point where a singer begins singing but does not include the singing. In some cases, the introductory and ending segments are so faint that the user may think that the playback has stopped, which may also lead to confusion. For video, the introductory segment and ending segment may include cinematic elements, credits, and the like.

Accordingly, aspects of the present disclosure address the above and other deficiencies by combining interstitials with introductory and ending segments of media content items in playlists, and/or by providing interstitials that are relevant to the surrounding media content items. That is, some aspects of the present disclosure involve procedurally generating a lengthy media content experience that may continue to be lengthened as the user views/listens to the playlist, thereby providing a real-time or near real-time experience for users. In one embodiment, interstitials may be inserted in between media content items during the ending segment of a first media content item currently playing and the introductory segment of a next media content item to be played. The timing of these interstitials and the lengths of the ending and introductory segments may be varied to produce a reduced amount of disruption to the user's viewing/listening experience. Interstitials having similar or different lengths may be inserted dynamically in the playlist as appropriate (e.g., a first interstitial may be inserted between a first pair of media content items in the playlist and a second, smaller interstitial may be inserted between a subsequent pair of media content items, or the same first interstitial may be inserted between the subsequent pair of media content items).

Accordingly, the interstitial may overlap at least a portion of the ending segment of the first media content item and at least a portion of the introductory segment of the second media content item to provide a smooth transition between the media content items. That is, the interstitial may be played to seamlessly transition from one media content item currently being played to the playback of the next media content item in the playlist. For example, the interstitial may be a voice-over announcing the recommendation reason for the next media content item and/or introducing the next media content item. Additionally, the interstitial may include a pre-recorded message from the artist during the ending segment of a first media content item and the introductory segment of a next media content item. The message may promote concerts and/or merchandise of the artist. Also, the interstitial may include an advertisement, a notification of events (e.g., text message, missed call, voicemail, email, etc.) occurring on a client device, a trivia tidbit, or the like during the ending segment and the introductory segment.

In some embodiments, the overlapping with the interstitial and the spacing (e.g., a time gap, otherwise referred to herein as a delta amount of time) between playback of the media content items are adjusted by comparing the lengths of the interstitial, the ending segment, and the introductory segment. For example, in response to a determination that the length of the interstitial exceeds the combined length of the ending segment of a first media content item and the introductory segment of a second media content item, spacing may be added between the ending segment of the first media content item and the introductory segment of the second media item. Dynamically adjusting the spacing between the ending segment of the first media content item and the introductory segment of the second media content item may enable playing the interstitial just over the ending segment and the introductory segment and not any main segments (e.g., that include foreground elements) of either the first or the second media content items. In another example, in response to a determination that the length of the interstitial is less than the combined length of the ending segment of the first media content item and the introductory segment of the second media content item, an interstitial overlap may be adjusted (e.g., centered) on the ending segment of the first media content item and the introductory segment of the second media content item. Additional scenarios are discussed in detail below.

Additionally, aspects of the present disclosure may involve identifying an interstitial (e.g., trivia tidbit) to suggest to users based on pairings of media content items that should be included in a playlist. The pairs may be generated by identifying media content items that have one or more identifiers that match one or more identifiers of an interstitial. The identifiers of the media content items and the interstitials may be related, for example, to represented entities (e.g., artist ID, producer ID, etc.), to content of the media content items and the interstitials (e.g., genre ID, topic ID, etc.), or to other properties/characteristics of the media content items and the interstitials (e.g., channel ID, video ID, album ID, etc.). The resulting pairs of media content items may be arranged in a playlist together with the interstitials that have the one or more matching identifiers as the respective pair of media content items. Each interstitial may be inserted between a first media content item and a second media content item in a respective pair of the resulting pairs in the playlist. Further, an optimization technique can be used to order a set of media content items such that these suggested interstitial intersections occur as frequently as possible. This may be beneficial to maintain a user's attention by providing an extendable cohesive playlist experience, thereby enhancing a likelihood that the user uses the content sharing platform longer.

In some embodiments, the interstitial may be a trivia tidbit relating to or intersecting with both a first media content item and a next media content item to be played immediately after the first media content item. For example, if a first song by band A is currently playing and the next song to play is by band. B, the media viewer may play a trivia tidbit indicating that the drummer in band A went on to found band B. The trivia tidbit may be played over an ending segment of the first song and an introductory segment of the next song. As such, the content of each interstitial may provide a transition from the first media content item to the second media content item to facilitate cohesiveness of content across the playlist. Creating a common theme for a viewing/listening session may engage the audience with the media viewer and enhance retention by enabling a relationship to be built between the user and the personalized media viewer.

It should be understood, that in some embodiments, relevant interstitials for respective pairs of media content items may be selected and ending segments and introductory segments may be combined with the interstitials to generate the playlist. For example, an optimized playlist may be generated that includes at least a threshold number of interstitials that intersect with pairs of media content items based on a retrieved number of media content items and a retrieved number of interstitials, and the lengths of ending/introductory segments, interstitial overlap on ending/introductory segments, and/or playback times of the media content items may be adjusted in the optimized playlist such that the interstitials may be played as desired (e.g., time may be added between an ending segment and an introductory segment to enable the interstitial to play fully).

Advantages of the disclosed embodiments may include reducing computing resources (e.g., memory, processing). For example, a combined length of time of playback for a first media content item, an interstitial, and a second media content item may be reduced by overlapping the ending/introductory segments of the media content items with the interstitial, which may reduce a memory size of the playlist. Further, in some instances, reducing the memory size of the playlist may enable using less bandwidth of a network over which the playlist is streaming. Another advantage is that combining the interstitial with the ending/introductory segments of the media content items and/or providing relevant interstitials may improve the user experience by providing a less jarring effect with a smoother transition between playback of media content items. Further, interstitials that are relevant to a pair of media content items may provide information to a user that the user would have otherwise manually looked up. Thus, the user may not open a separate user interface and transmit a search query to a search platform over a network, which may reduce the use of computing resources (e.g., network bandwidth, processing of the search platform, memory of the search platform, etc.). Another advantage of the described embodiments may include enhanced user reliance on the content sharing platform as the user develops confidence in and/or enjoyment of the relevance of the media content items selected and played, as well as the interstitials that are selected and combined with the media content items. Embodiments may therefore address problems associated with providing media content items to a user in a networked environment.

FIG. 1 illustrates an example system architecture 100 that includes client devices 110a through 110z, a network 105, a data store 106, a content sharing platform 120, a server 130, and third-party platform(s) 150. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110a through 110z may each include computing devices such as personal computers (PCs), laptops, mobile phones, smart phones, tablet computers, network connected televisions, netbook computers etc. In some implementations, client devices 110a through 110z may also be referred to as "user devices." Each client device includes a respective media viewer 112a-z. In one implementation, the media viewers 112a-z may be applications that allow users to view and/or listen to media content, such as images, videos, songs (e.g., music content items), web pages, documents, etc. For example, the media viewers 112a-z may be a web browser that can access, retrieve, present, and/or navigate content (e.g., web pages such as Hyper Text Markup Language (HTML) pages, media content items, etc.) served by a web server. The media viewers 112a-z may render, display, and/or present the content (e.g., web pages) to a user. The media viewers 112a-z may also display an embedded media viewer (e.g., a Flash® player or an HTML5 player) that is embedded in a web page (e.g., a web page that may provide information about a product sold by an online merchant). In another example, the media viewers 112a-z may be standalone applications (e.g., mobile applications) that allow users to view and/or listen to digital media content items (e.g., digital videos, songs, digital images, electronic books, etc.).

The media viewers 112a-z may be provided to the client devices 110a through 110z by the server 130 and/or content sharing platform 120. For example, the media viewers 112a-z may be embedded media players that are embedded in web pages provided by the content sharing platform 120. In another example, the media viewers 112a-z may be applications that communicate with the server 130 and/or content service provider 120.

It should be noted that functions described in one implementation as being performed by the content sharing platform 120 can also be performed on the client devices 110a through 110z, and/or server 130 in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platforms 120 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to media content items (also referred to as content items) and/or provide the media content items to the user. For example, the content sharing platform 120 may allow a user to consume, upload, search for, approve of ("like"), dislike, and/or comment on media content items. The content sharing platform 120 may also include a website (e.g., a webpage) that may be used to provide a user with access to the media content items.

In implementations of the disclosure, a "user," a "content creator," or a "channel owner" may be represented as a single individual. However, other implementations of the disclosure encompass a "user," a "content creator," or a "channel owner" being an entity controlled by a set of users and/or an automated source. For example, a set of individual users federated as a community in a social network may be considered a "user," a "content creator," or a "channel owner." In another example, an automated consumer may be an automated ingestion pipeline, such as a topic channel, of the content sharing platform 120.

The content sharing platform 120 may include multiple channels (e.g., channel 121). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. A channel may include one or more media content items 121a-n (e.g., music content items) and one or more interstitials 125a-n (e.g., voice over announcements, advertisements, pre-recorded messages from an artist of the next media content item, a trivia tidbit relating to both a media content item currently playing and the next media content item to play, etc.).

According to an implementation, in which items of channel 121 are streamed one after another (similar to a playlist that is also referred to as a streaming radio station or a radio), the interstitials (e.g., interstitial 125a) may overlap at least a portion of an ending segment of a first media content item (e.g., media content item 121a) and at least a portion of an introductory segment of a second media content item (e.g., media content item 121b). Since the ending segment/introductory segments just include background elements without foreground elements, overlapping the ending segment of the first media content item and the introductory segment of the second media content item with the interstitial may refer to playing the interstitial during the ending segment/introductory segment. Additionally or alternatively, overlapping the ending segment of the first media content item and the introductory segment of the second media content item with the interstitial may refer to replacing at least some portions of the ending segment/introductory segment with the interstitial.

Further, the length of the interstitial and the combined length of the pair media content items with which the interstitial is overlapped may be compared. If the length of the interstitial is less than the combined length of the pair of media content items, the overlap of the interstitial on the ending segment of the first media content item and the analysis introductory segment of the second media content item may be adjusted. If the length of the interstitial exceeds the combined length of the pair of media content items, spacing may be added between the ending segment of the first media content item and the introductory segment of the second media content item.

In another implementation, each interstitial inserted between a pair of media content items may be related to both media content items in the pair. For example, the interstitial (e.g., interstitial 125a) may be a trivia tidbit that indicates the singer of song A (e.g., media content item 121a) went on to form the band playing song B (e.g., media content item 121b). Further, the media content items 121a-n and the interstitials 125a-n may be selected and arranged such that the intersections of the interstitials relating to both media content items in a pair occurs as frequently as possible, as described in more detail below.

A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking," "following," "friending," and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform 120, feed items produced by that channel may be shown on the channel home page. Users may have a syndicated feed, which is a feed comprised of at least a subset of the media content items and interstitials from all of the channels to which the user is subscribed. Syndicated feeds may also include media content items and interstitials from channels to which the user is not subscribed. For example, the content sharing platform 120 or other social networks may insert recommended media content items and interstitials into the user's syndicated feed, or may insert media content items and interstitials associated with a related connection of the user in the syndicated feed.

The content sharing platform 120 may also include multiple playlists 122. A playlist may include a collection of media content items 122a-n and interstitials 126a-n where the media content items and interstitials are configured to play one after another in a particular order without any user interaction. When the last media content item stops playing, an interstitial may play and then the first media item may start playing again, providing a continuous viewing or listening experience for the user. The interstitials may be included in the playlist 122 similar to the way described above with relation to the channel 121. It should be noted that the playlist 122 may be continuously updated with different recommended media content items and relevant interstitials based on whether the user "likes" or "dislikes" a song currently playing, skips a song currently playing, or the like. A streaming radio station also referred to as a radio may correspond to a playlist that provides a dynamic, continuous stream of audio that may or may not be paused or replayed (similarly to a traditional broadcast media radio station). In some implementations, streaming radio stations may be buffered for offline access. As used herein, the term "music playlist" covers a streaming radio station providing audio music content, as well as a playlist providing music videos and/or other type of content.

Playlists may be curated manually or automatically (e.g., according to genre, artist, band, tempo, dates, etc.). Media content items included in playlist 122 may be from the same channel, different channels or independent media content items that are not part of any channels. Examples of media content items 121a-n and 122a-n can include, and are not limited to, digital videos, digital movies, digital photos, digital music, web site content, social media updates, electronic books (ebooks), electronic magazines, digital newspapers, digital audio books, electronic journals, web blogs, real simple syndication (RSS) feeds, electronic comic books, software applications, etc. Media content items 121a-n and 122a-n, also referred to herein as music content items, music videos and songs, can include an electronic file that can be executed or loaded using software, firmware or hardware configured to present the digital media item to an entity. In one implementation, the content sharing platform 120 may store the media content items 121a-n and 122a-n using the data store 106.

Further, the interstitials included in playlist 122 may include voice over announcements of the recommendation reason and/or introduction of the next song to be played, general advertisements, promotions of concerts and/or merchandise related to the media content items, notifications of events on the client device (e.g., text message received, email received, missed call, etc.), and/or trivia tidbit related to both a first media content item in a pair of media content items and a second media content item in the pair. In embodiments where the interstitial is a trivia tidbit, the media content items 122a-n and the interstitials 126a-n may be identified based on one or more identifiers. The identifiers may be related to represented entities (e.g., artist ID, producer ID, etc.), to content of the media content items and the interstitials (e.g., genre ID, topic ID, etc.), or to other properties/characteristics of the media content items and the interstitials (e.g., channel ID, video ID, album ID, etc.). The media content items may be paired based on the identified interstitials such that each resulting pair has one or more identifiers that match one or more identifiers of one of the interstitials. The resulting pairs of media content items may be arranged in the playlist 122 together with the interstitials that have the one or more matching identifiers such that each interstitial is inserted between a first media content item and a second media content item in a respective pair of the resulting pairs in the playlist. The arrangement may be performed to include as many pairs with intersecting interstitials as possible based on the identifiers from the available media content items and interstitials. The interstitials may be stored in the data store 106. In some implementations, the interstitials may be provided by a first party (e.g., user enters comments relating media content items together), third-party (e.g., artist or band or producer enters), extracted from a website, and so forth.

The content sharing platform 120 may include content consumption system 127 that determines a history of user actions associated with media items content 121a-n, 122a-n. In one example, the content consumption system 127 may store a list of music content items accessed, watched or listened to by a user. In another example, the content consumption system 127 may also store search queries submitted by a user on the content sharing platform 120.

The content sharing platform 120 may be associated with or include a playlist generation system 140 hosted by the server 130. The server 130 may be one or more computing devices (e.g., a rackmount server, a server computer, etc.). The playlist generation system 140 may provide playlists including media content items and interstitials to users of the content sharing platform 120. As discussed in more detail herein, these playlists may include interstitials inserted between respective pairs of media content items. The way in which the interstitials are inserted may include overlapping ending/introductory segments of the pair of media content items with the interstitials. Further, the interstitial may be related to both media content items in the pair of media content items (e.g., based on identifiers) to provide a transition from the first media content item in the pair to the second media content item in the pair. The transition may facilitate cohesiveness of content across the playlist. The media content items in the playlist may be ordered in an optimized way such that the intersections of interstitials matching identifiers of a pair of media content items occur as frequently as possible.

Users of the content sharing platform 120 may also interact with third-party platform(s) 150. A third-party platform 150 may be a social network platform (e.g., social media platform), a search engine platform, another content sharing platform, etc. Another type of third-party platform may be an online encyclopedia where information about artists, albums, genres, topics, music, videos, songs, movies, or the like may be obtained. This information may be obtained by the playlist generation system 140 from the third-party platform 150 (e.g., by using an application programming interface (API) or querying service of the third-party platform 150) and included in the interstitials.

Although implementations of the disclosure are discussed in terms of content sharing platforms and providing playlists including media content items and interstitials on the content sharing platform, implementations may also be generally applied to any type of platform providing playlists or similar combinations of media items. Such platforms are not limited to content sharing platforms that provide channel subscriptions, playlists, and/or internet radio stations to users.

In situations in which the systems discussed herein collect personal information about users, or may make use of personal information, the users may be provided with an opportunity to control whether the content sharing platform 120 collects user information (e.g., information about a user's social network, social actions or activities, profession, a user's preferences, a user's purchase transaction history, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
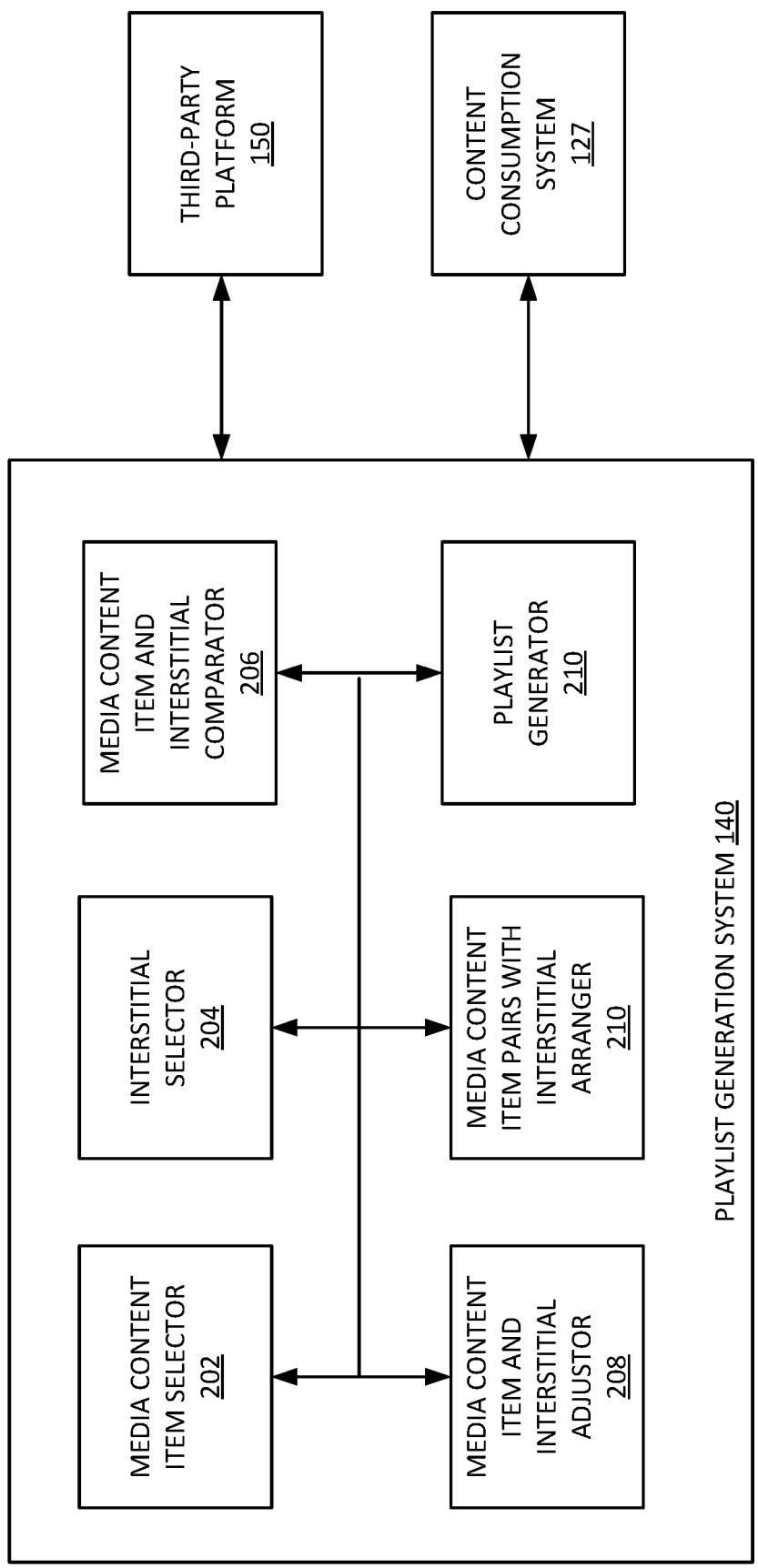
FIG. 2 is a block diagram illustrating an example playlist generation system, in accordance with some aspects of the present disclosure.

FIG. 2 is a block diagram illustrating an example playlist generation system 140 in accordance with some aspects of the present disclosure. In one implementation, playlist generation system 140 includes media content item selector 202, interstitial selector 204, media content and interstitial comparator 206, media content item and interstitial adjustor 208, media content item pairs with interstitial arranger 210, and playlist generator 210. Playlist generation system MO may communicate with third-party platform (e.g., social network, online encyclopedia, etc.) 150 and/or content consumption system 127.

The media content item selector 202 may identify and select a number of media content items for a playlist. Initially, the media content items may be selected from the data store 106 based on user selection or personalized information relating to the user of the client device 110. For example, the media content items may be selected based on the media content items previously "liked" or "disliked" by the user, amount of time the user has viewed/listened to the media content items, whether the user previously skipped the media content item, whether the user has previously queried for the media content item, and the like. The media content item selector 202 may perform the operation of selecting media content items from the data store 106 in real-time or near real-time as the user interacts with the media viewer 112 presenting the media content item. That is, if the user "likes" a media content item during a listening/viewing session, the media content selector 202 may select other media content items similar to the "liked" to update the playlist.

Each media content item selected may include an introductory segment, one or more main segments, and an ending segment. The one or more main segments may include foreground elements (e.g., singing, video scenes) included with the body of the actual content of media content items. The introductory segment may refer to a period of time at the beginning of the media content item that may include certain background elements, credits, or the like and that ends at a certain timestamp (also referred to as a play time of the media content item). The timestamp for the introductory segment represents how far into the media content item the introductory segment ends. The ending segment may refer to a period of time at the end of the media content item that may include certain background elements, credits, or the like and that begins at a certain timestamp. The timestamp for the ending segment represents how far into the video the ending segment begins. The playlist generation system 140 may obtain the timestamps for the introductory segments and the ending segments of the media content items when they are selected. For example, the timestamps may be included as metadata tags associated with the media content items stored in the data store 106. The timestamps may be used to determine the lengths of the introductory/ending segments for each media content item, as discussed below.

Each media content item selected may include one or more identifiers. The identifiers may relate to represented entities (e.g., artist ID, producer ID, etc.), to content of the media content items and the interstitials (e.g., genre ID, topic ID, etc.), or to other properties/characteristics of the media content items and the interstitials (e.g., channel ID, video ID, album ID, etc.). The identifiers may be included as metadata tags associated with the media content items in the data store 106. The identifiers may be assigned to media content items by first-parties (the user), artists, producers, distributors, and the like. The identifiers may be used to pair media content items with interstitials having one or more matching identifiers, as discussed below. A randomization component may be used by the media content item selector 202 to add variety to the selection of media content items.

The interstitial selector 204 may identify and select a number of interstitials from the data store 106. In an implementation, the interstitial may be a media content item including video, audio, text, or the like. The interstitials may include one or more identifiers similar to the media content items. The identifiers may also be related to various entities, artist ID, channel ID, video ID, album ID, genre ID, topic ID, and so forth. The interstitial may be a voice over announcement of the recommendation reason for playing the next media content item. For example, if the user is listening to a playlist related to a certain type of music, the voice over announcement may indicate that the next song is of the same type of music by a different band. Further, the interstitials may be used to pair media content items that include one or more matching identifiers with the interstitial. As such, in an implementation, the interstitial may be used to provide information (e.g., trivia) related to both a first media content item (e.g., the song currently playing) and to a second media content item (e.g., the next song to be played). Thus, a smooth transition between the content of the first media content item to the content of the second media content item may be provided to facilitate cohesiveness of the listening/viewing session.

In other implementations, the interstitial may include an advertisement, promotions for concerts/merchandise, and notifications of events occurring on the client device 110, among others. The interstitial selector 204 may maintain a history of the interstitials previously presented to the user. In an example, the interstitial selector 204 may exclude any interstitials previously presented from being selected again. Also, a randomization component may be used by the interstitial selector 204 to add variety to the selection of interstitials.

The media content item and interstitial comparator 206 may determine a length of the introductory segments and ending segments of each media content item. For example, the media content item and interstitial comparator 206 may use the timestamp (e.g., 15 seconds) of the introductory segment to determine the length of the introductory segment. Also, the media content item and interstitial comparator 206 may subtract the timestamp (e.g., 120 seconds) of the ending segment, which represents how far into the media content item the ending segment begins, from the total length of the media content item to determine the length of the ending segment. For example, if the ending segment includes a timestamp of 120 seconds and the total length of the media content item is 140 seconds, then the length of the ending segment is 20 seconds (140 seconds-120 seconds). The media content item and interstitial comparator 206 may also determine the length of each interstitial. The lengths of the interstitials may be included in metadata tags with the interstitials in the data store 106. Additionally or alternatively, the length of the interstitial may be determined dynamically (e.g., when audio voice is being procedurally generated). The media content item and interstitial comparator 206 may determine whether a length of a selected interstitial exceeds a combined length of the ending segment of a first selected media content item and the introductory segment of a second selected media content item.

The media content item and interstitial adjustor 208 may perform operations based on the comparison made by the media content item and interstitial comparator 206. The media content item and interstitial adjustor 208 may be used to ensure the interstitial fits over the ending segment/introductory segment of media content item pairs without playing on any main segments of the pairs. For example, in response to a determination that the length of the interstitial exceeds the combined length of the ending segment of the first media content item and the introductory segment of the second media content item, the media content item and interstitial adjustor 208 may add a spacing between the ending segment of the first media content item and the introductory segment of the second media content item. Also, the media content item and interstitial adjustor 208 may be used to ensure the interstitial overlaps over desired portions of the ending segment/introductory segment of media content item pairs. For example, in response to determining that the length of the interstitial is less than the combined length of the ending segment of the first media content item and the introductory segment of the second media content item, the media content item and interstitial adjustor 208 may adjust an overlap of the interstitial on the ending segment and the introductory segment.

The media content item pairs with interstitial arranger 210 may be used to pair the identified and selected media content items based on the interstitials. Each resulting pair may have one or more identifiers that match one or more identifiers of one of the interstitials. Thus, the interstitial for each pair may provide information (trivia) relevant to content of each media content item in the pair because of the matching identifiers. For example, the interstitial for two songs (song A and song B) may indicate that the artist of song A went on to form the band that plays song B. The media content item pairs with interstitial arranger 210 may arrange the resulting pairs of media content items in a playlist together with the interstitials that have the one or more matching identifiers. Each interstitial is inserted between a first media content item and a second media content item in a respective pair of the resulting pairs in the playlist.

In an implementation, the media content item pairs with interstitial arranger 210 may arrange the resulting pairs of media content items and the interstitials in the playlist based on a score of a frequency of occurrence of pairs of media content items having the one or more identifiers that match the one or more identifiers of one of the interstitials. For example, a graph may be generated with nodes representing the selected media content items and the selected interstitials. The selected media content items may be linked by the selected interstitials based on the matching identifiers. The media content item pairs with interstitial arranger 210 may score the longest traversal of the graph (e.g., the highest total count of media content items and interstitials) with a highest score. In some embodiments, certain media content items themselves may be weighted based on the user's affinity to the media content item. In such cases, the score may be determined by the summed weight of each of the media content items instead of total count of media content items and interstitials. Further, weights may be assigned to pairs and interstitials based on how narrow the matching identifiers are. For example, an interstitial that specifically relates to two specific videos in a pair of media content items may have a higher weighting than an interstitial that pertains to two artists or two genres.

In another implementation, in a playlist of more than two media content items, it may be desirable to insert an interstitial that pertains to two media content items that are not immediately adjacent to one another. For example, a piece of trivia may refer to the next song and the song before last. In these instances, the weights may be adjusted such that the interstitials relating to media content items further apart have higher weights than interstitials relating to adjacent media content items.

The playlist generator 210 may generate the playlist that includes the media content items and the interstitials. In an implementation, the playlist generator 210 may transmit the playlist to the media viewer 112 of the client device 110 to be presented to the user. In some embodiments, where the media content items and the interstitials are just audio, the user may hear the interstitials between songs in the playlist. In these cases, the interstitials may enhance a hands-free listening experience. For example, the interstitial may read off text messages received by the client device 110 while a song was playing without the user having to pick up the client device 110. Further, when the media viewer 112 is operating in background playback mode, and no user interface is available for displaying banner elements or information, the interstitials may be used to smoothly transition between the content of two media content items and provide for a cohesive listening session. In some implementations, a user interface may be displayed while the user is listening to songs in the playlist, and the user interface may be used to display images included with the interstitial.

Figure 3:
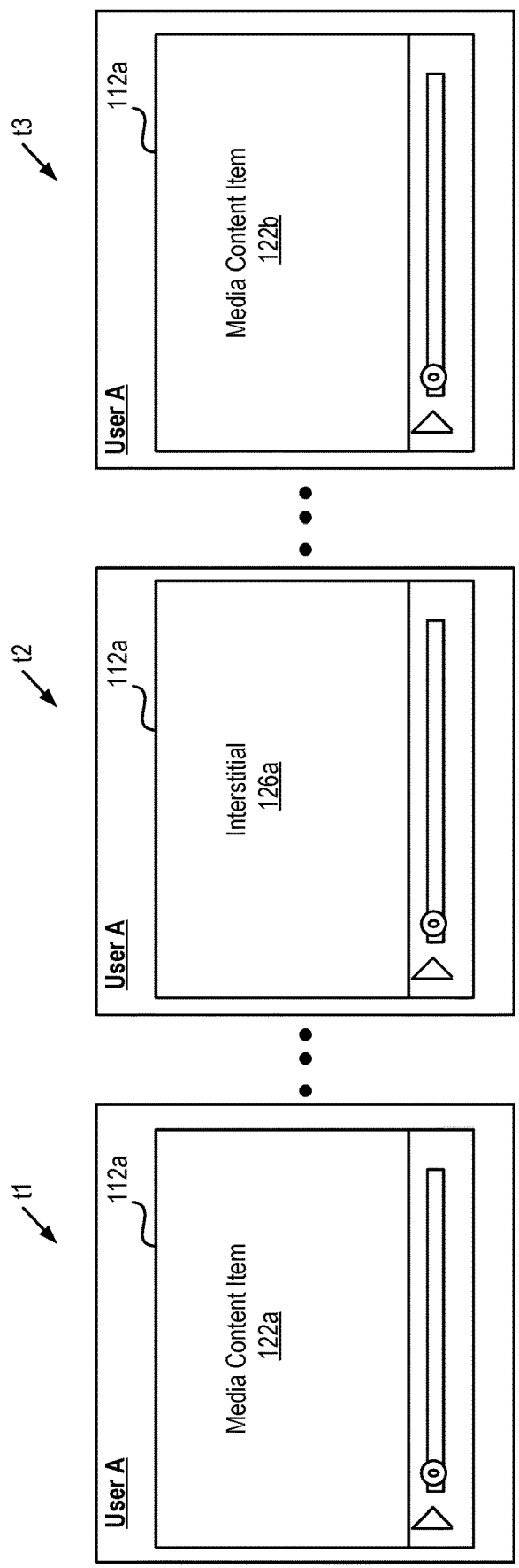
FIG. 3 depicts an example media viewer that plays an interstitial in between media content items, according to an implementation.
Figure 4:
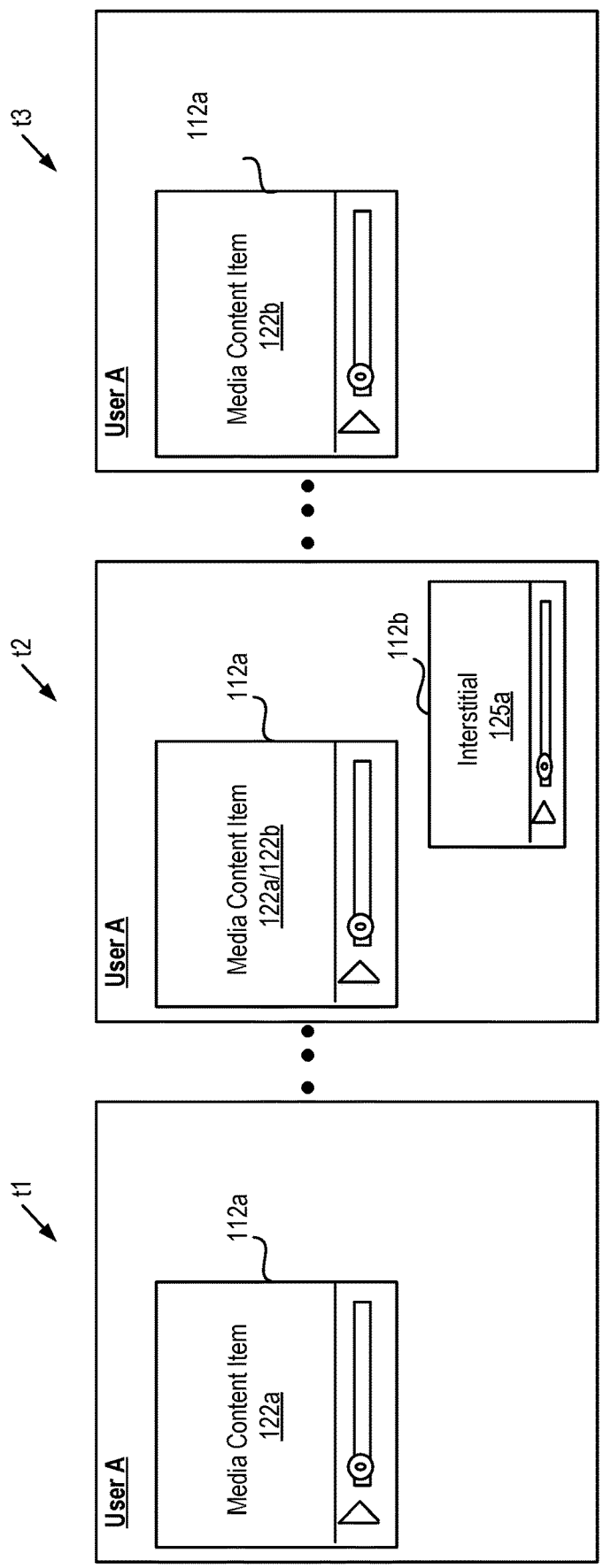
FIG. 4 depicts a first example media viewer that plays media content items and a second example media viewer that plays an interstitial, according to an implementation.
Figure 5:
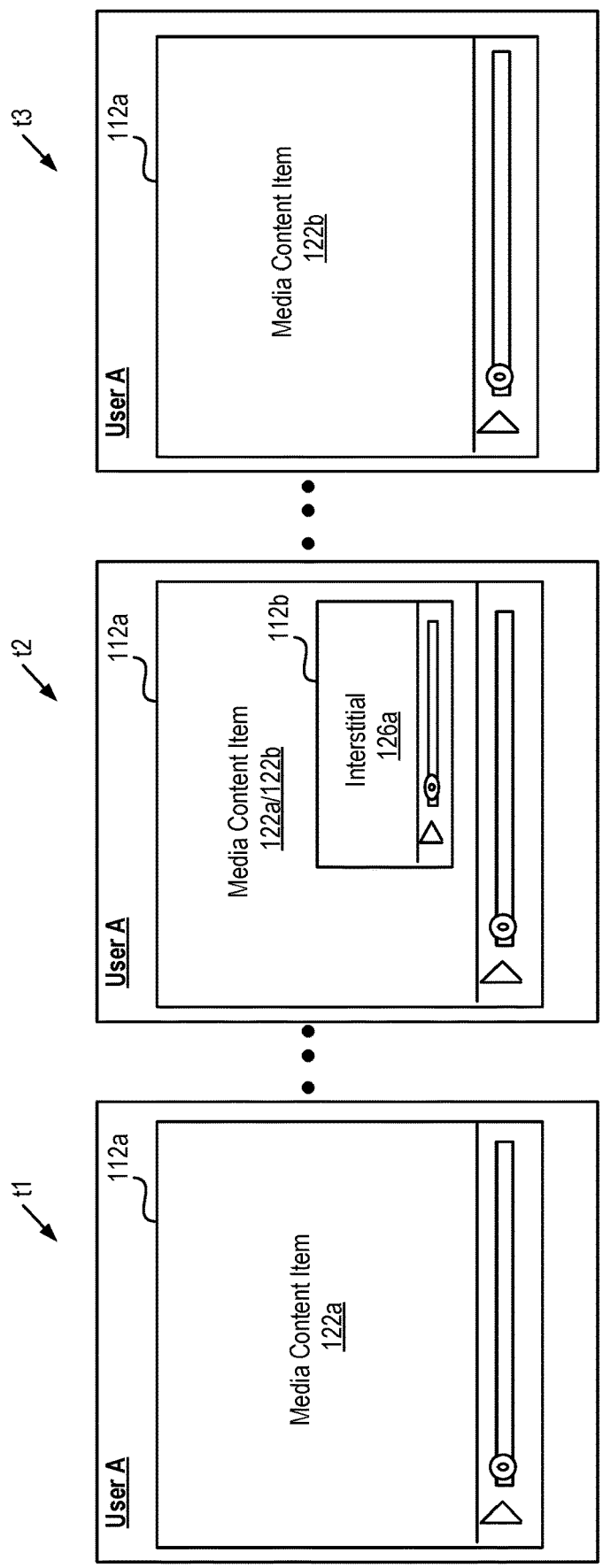
FIG. 5 depicts a first example media viewer that plays media content items and a second media viewer, within the first media viewer, that plays an interstitial, according to an implementation.

However, the implementations of the present disclosure may also use video as the interstitials. As such, FIGS. 3-5 depicts video interstitial examples where one or more media viewers are used to play the video interstitials during an introductory/ending segment period and between the main segments of two media content items. Various techniques may be used to overlap the video of media content items with video of an interstitial over portions of the ending/introductory segment periods. For example, the video of the ending segment of a first media content item may be faded out as the interstitial video is faded in, and the video of the interstitial video may be faded out as the video of the introductory segment of a second media content item is faded in.

FIG. 3 depicts an example media viewer 112a that plays an interstitial 126a in between media content items 122a and 122b in a playlist 122, according to an implementation. In the depicted example, the media viewer 112a may be a media player embedded in a website or included in a standalone application and the media content items 122a and 122b may be videos. The interstitial 126a may be a trivia tidbit related to both the first media content item 122a and the second media content item 122b, a voice-over announcement for a reason to play the second media content item 122b, an advertisement, a promotion of a concert or merchandise, a notification of an event on the client device 110, or the like. In some implementations, the interstitial 126a may have one or more identifiers that match one or more identifiers of the first media content item 122a and the second media content item 122b. The interstitial 126a may be inserted in the playlist such that it overlaps at least a portion of the ending segment of the first media content item 122a and at least a portion of the second media content item 122b.

As depicted, during time period t1, the media viewer 112a may play the media content item 122a. During time period t2, the interstitial 126a may be played in the media viewer 112a during at least the overlapped portion of the ending segment of the first media content item 122a, or the interstitial 126a may replace at least the overlapped portion of the ending segment of the first media content item 122a. When the interstitial 126a is played during at least the overlapped portion of the ending segment, fading elements may be used to fade in the interstitial 126a in the media viewer 112a and fade out the overlapped portion of the ending segment.

During time period t3, the media viewer 112a may begin playback of the introductory segment of the second media content item 122b. The interstitial 126a may continue playing during at least the overlapped portion of the introductory segment, or the interstitial 126a may replace at least the overlapped portion of the introductory segment of the second media content item 122b. In instances where the interstitial 126a plays during the introductory segment, fading elements may be used to fade out the interstitial 126a in the media viewer 112a and fade in the overlapped portion of the introductory segment. As such, a single media viewer 112a may be used to play the first media content item 122a, the interstitial 126a, and the media content item 122b.

FIG. 4 depicts a first example media viewer 112a that plays media content items 122a and 122b and a second example media viewer 112b that plays an interstitial 126a, according to an implementation. In the depicted example, the media viewers 112a and 112b may be media players embedded in a website or included in a standalone application and the media content items 122a and 122b may be videos. The interstitial 126a may be a trivia tidbit related to both the first media content item 122a and the second media content item 122b, a voice-over announcement for a reason to play the second media content item 122b, an advertisement, a promotion of a concert or merchandise, a notification of an event on the client device 110, or the like. In some implementations, the interstitial 126a may have one or more identifiers that match one or more identifiers of the first media content item 122a and the second media content item 122b. The interstitial 126a may be inserted in the playlist such that it overlaps at least a portion of the ending segment of the first media content item 122a and at least a portion of the second media content item 122b.

As depicted, during time t1, the first media viewer 112a may play the media content item 122a and the second media player 112b may be invisible or hidden. During time period t2, the second media viewer 112b may appear outside of but proximate to the first media viewer 112a, and the interstitial 126a may be played in the second media viewer 112b during at least the overlapped portion of the ending segment of the first media content item 122a being played in the first media viewer 112a, or the interstitial 126a may replace at least the overlapped portion of the ending segment of the first media content item 122a. Also during time period t2, after playback completion of the first media content item 122a, the first media viewer 112a may begin playing the introductory segment of the second media content item 122b. The interstitial 126a may continue playing in the second media viewer 112a during the introductory segment until the interstitial 126a completes.

During time period t3, after completion of the interstitial 126a, the first media viewer 112a may continue playing the second media content item 122b, and the second media viewer 112b may disappear or become hidden. As such, two media viewers 112a and 112b, one proximate to the other, may be presented to play the first media content item 122a, the interstitial 126a, and the second media content item 122b.

FIG. 5 depicts a first example media viewer 112a that plays media content items 122a and 122b and a second media viewer 112b, within (e.g., in-line) the first media viewer 112a, that plays an interstitial 126a, according to an implementation. In the depicted example, the media viewers 112a and 112b may be media players embedded in a web site or included in a standalone application and the media content items 122a and 122b may be videos. The interstitial 126a may be a trivia tidbit related to both the first media content item 122a and the second media content item 122b, a voice-over announcement for a reason to play the second media content item 122b, an advertisement, a promotion of a concert or merchandise, a notification of an event on the client device 110, or the like. In some implementations, the interstitial 126a may have one or more identifiers that match one or more identifiers of the first media content item 122a and the second media content item 122b. The interstitial 126a may be inserted in the playlist such that it overlaps at least a portion of the ending segment of the first media content item 122a and at least a portion of the second media content item 122b.

As depicted, during time t1, the first media viewer 112a may play the media content item 122a and the second media player 112b may be invisible or hidden. During time period t2, the second media viewer 112b may appear within (e.g., overlapping a portion of) the first media viewer 112a, and the interstitial 126a may be played in the second media viewer 112b during at least the overlapped portion of the ending segment of the first media content item 122a being played in the first media viewer 112a, or the interstitial 126a may replace at least the overlapped portion of the ending segment of the first media content item 122a. Also during time period t2, after playback completion of the first media content item 122a, the first media viewer 112a may begin playing the introductory segment of the second media content item 122b. The interstitial 125a may continue playing in the second media viewer 112a during the introductory segment until the interstitial 126a completes.

During time period t3, after completion of the interstitial 126a, the first media viewer 112a may continue playing the second media content item 122b, and the second media viewer 112b may disappear or become hidden. As such, two media viewers 112a and 112b, one within another, may be presented to play the first media content item 122a, the interstitial 126a, and the second media content item 122b.

Figure 6:
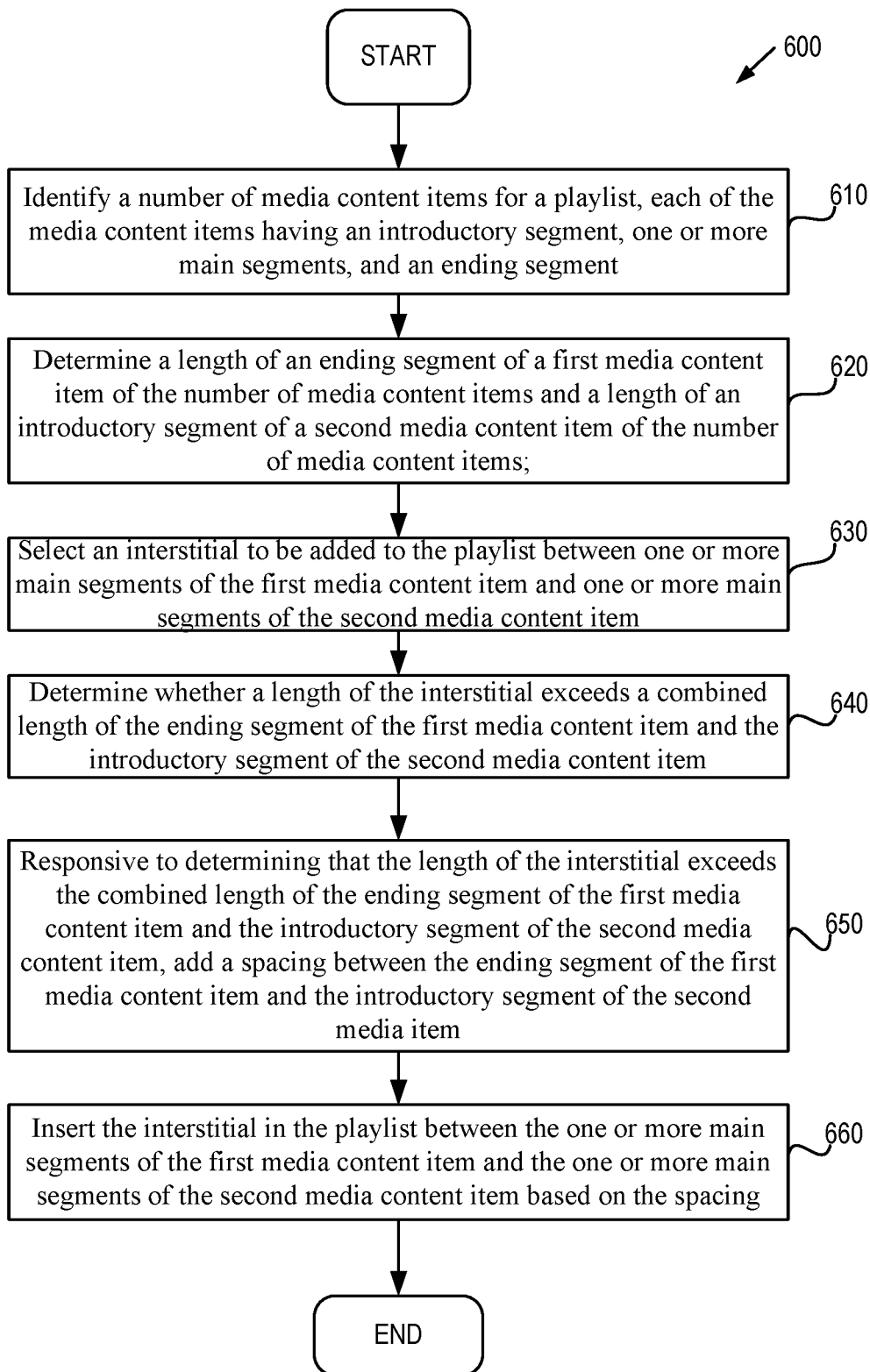
FIG. 6 is a flow diagram of an example method for overlapping an ending segment of a first media content item and an introductory segment of a second media content item with an interstitial, according to an implementation.
Figure 7:
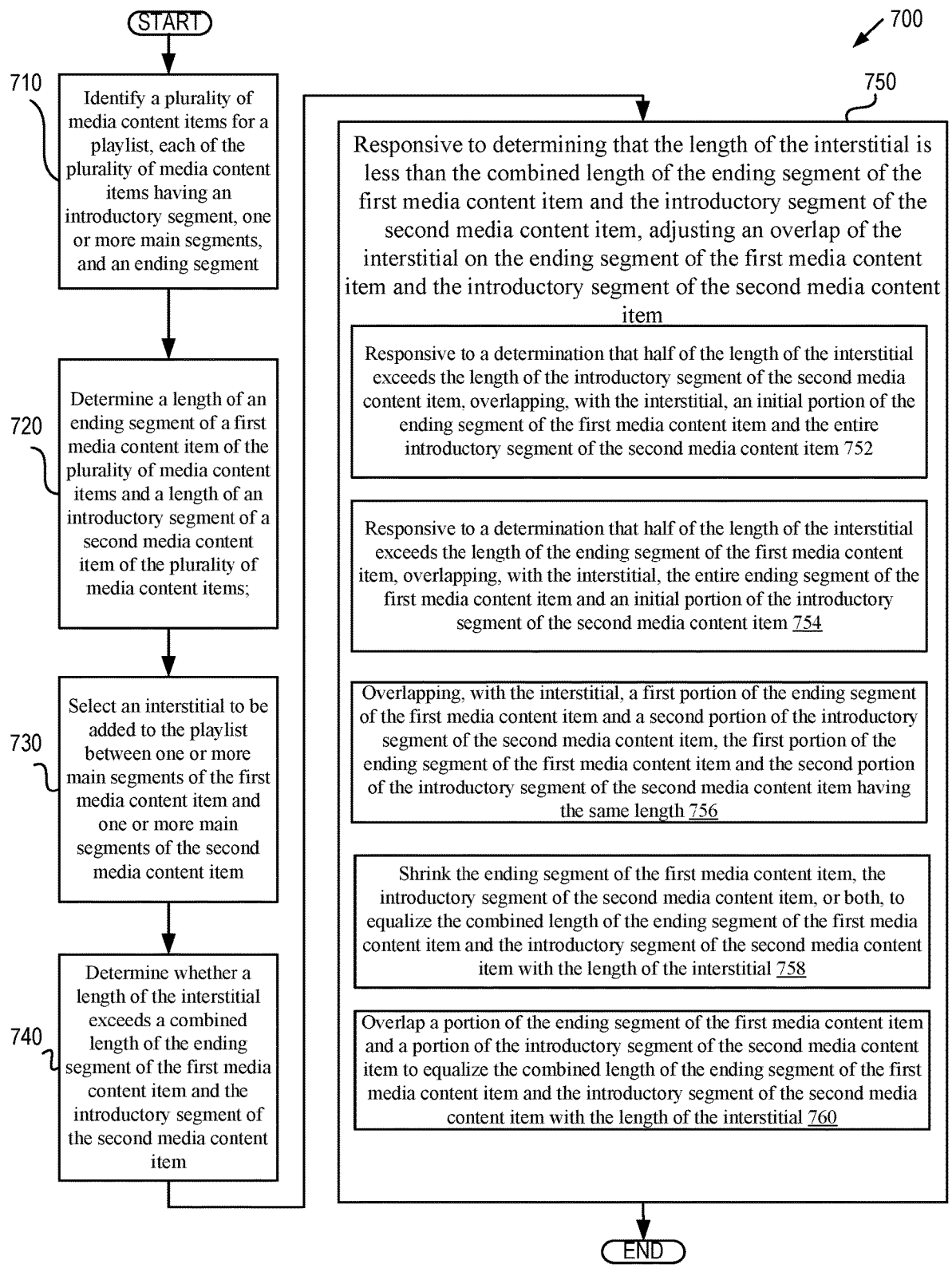
FIG. 7 is a flow diagram of an example method for adjusting an overlap of the ending segment of the first media content item and the introductory segment of the second media content item with an interstitial, according to an implementation.

FIG. 6-7 depict flow diagrams of illustrative examples for methods 600 and 700 for overlapping segments of media content items with an interstitial, according to an implementation. Methods 600 and 700 may be performed by processing devices that may include hardware (e.g., circuitry, dedicated logic), software (such as is run on a general purpose computer system or a dedicated machine), or a combination of both. Methods 600 and 700 and each of their individual functions, routines, subroutines, or operations may be performed by one or more processors of the computer device executing the method. In certain implementations, methods 600 and 700 may each be performed by a single processing thread. Alternatively, methods 600 and 700 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

FIG. 6 is a flow diagram illustrating an example method 600 for overlapping an interstitial over an ending segment of a first media content item and an introductory segment of a second media content item, according to an implementation. Method 600 may be performed by content sharing platform 120 and/or playlist generation system 140 of FIG. 1.

Referring to FIG. 6, at block 610, processing logic may identify a number of media content items for a playlist. Each or some of the media content items may have an introductory segment, one or more main segments, and an ending segment. Such media content items may include timestamps for how far into the media content item the introductory segment ends and how far into the media content item begins.

At block 620, the processing logic may determine a length of the ending segment of a first media content item of the number of media content items and a length of an introductory segment of a second media content item of the number of media content items. The processing logic may use the timestamps discussed above to determine the lengths of the ending segment of the first media content item and the introductory segment of the second media content item. In some instances, the length of the ending segment and the introductory segment may be pre-determined and provided in metadata of the media content items.

At block 630, the processing logic may select an interstitial to be added to the playlist between one or more main segments of the first media content item and one or more main segments of the second media content item. The interstitial 126a may be a trivia tidbit related to both the first media content item 122a and the second media content item 122b (e.g., has one or more identifiers that match one or more identifiers of the first media content item and the second media content item), a voice-over announcement for a reason to play the second media content item 122b, an advertisement, a promotion of a concert or merchandise, a notification of an event on the client device 110, or the like.

At block 640, the processing logic may determine whether a length of the interstitial exceeds a combined length of the ending segment of the first media content item and the introductory segment of the second media content item. Responsive to determining that the length of the interstitial exceeds the combined length of the ending segment of the first media content item and the introductory segment of the second media content item, the processing logic may add (block 650) a spacing between the ending segment of the first media content item and the introductory segment of the second media item. The spacing may be determined by the processing logic subtracting the combined length of the ending segment of the first media content item and the introductory segment of the second media content item from the length of the interstitial to obtain a difference, and adding the difference as spacing between the ending segment and the introductory segment. For example, if the length of the ending segment is 5 seconds, the length of the introductory segment is 10 seconds, and the length of the interstitial is 20 seconds, then the length (20 seconds) of the interstitial exceeds the combined length (15 seconds) of the ending segment and introductory segment. As such, the processing logic may subtract 15 seconds from 20 seconds to obtain a difference of 5 seconds and add a spacing of 5 seconds between the ending segment and the introductory segment.

At block 660, the processing logic may insert the interstitial in the playlist between the one or more main segments of the first media content item and the one or more main segments of the second media content item based on the spacing. In the above example, the 20 second interstitial may be fit between the main segments of the first media content and the second media content by adding the 5 second spacing in between the 5 second ending segment of the first media content item and the 10 second introductory segment of the second media content item. In this example, the inserted interstitial overlaps the entire ending segment of the first media content item and the entire introductory segment of the second media content item. In other cases, the inserted interstitial overlaps at least a portion of the ending segment of the first media content item and at least a portion of the introductory segment of the second media content item. The playlist may be presented to the user via one or more media viewers 112 for playback, as discussed above.

FIG. 7 is a flow diagram of an example method 700 for adjusting an overlap of the interstitial on the ending segment of the first media content item and the introductory segment of the second media content item, according to an implementation. Method 700 may be performed by content sharing platform 120 and/or playlist generation system 140 of FIG. 1.

Referring to FIG. 7, at block 710, processing logic may identify a number of media content items for a playlist. Each or some of the media content items may have an introductory segment, one or more main segments, and an ending segment. At block 720, the processing logic may determine a length of the ending segment of a first media content item of the number of media content items and a length of an introductory segment of a second media content item of the number of media content items. At block 730, the processing logic may select an interstitial to be added to the playlist between one or more main segments of the first media content item and one or more main segments of the second media content item. The interstitial 126a may be a trivia tidbit related to both the first media content item 122a and the second media content item 122b (e.g., has one or more identifiers that match one or more identifiers of the first media content item and the second media content item), a voice-over announcement for a reason to play the second media content item 122b, an advertisement, a promotion of a concert or merchandise, a notification of an event on the client device 110, or the like.

At block 740, the processing logic may determine whether a length of the interstitial exceeds a combined length of the ending segment of the first media content item and the introductory segment of the second media content item. Responsive to determining that the length of the interstitial is less than the combined length of the ending segment of the first media content item and the introductory segment of the second media content item, the processing device may adjust (block 750) an overlap of the ending segment of the first media content item and the introductory segment of the second media content item with the interstitial.

A further determination may be made whether half of the length of the interstitial exceeds the length of the introductory segment of the second media content item. If so, processing logic may overlap (block 752), with the interstitial, an initial portion of the ending segment of the first media content item and the entire introductory segment of the second media content item. Another determination may be made whether half of the length of the interstitial exceeds the length of the ending segment of the first media content item. If so, processing logic may overlap (block 754), with the interstitial, the entire ending segment of the first media content item and an initial portion of the introductory segment of the second media content item.

In one implementation, adjusting the overlap of the ending segment of the first media content item and the introductory segment of the second media content item with the interstitial may include overlapping (block 756), with the interstitial, a first portion of the ending segment of the first media content item and a second portion of the introductory segment of the second media content item, the first portion of the ending segment of the first media content item and the second portion of the introductory segment of the second media content item having the same length. As a result, the interstitial may be centered over the first portion of the ending segment and the second portion of the introductory segment.

In one implementation, adjusting the overlap of the ending segment of the first media content item and the introductory segment of the second media content item with the interstitial may include shrinking (block 758) the lengths of the ending segment of the first media content item and/or the introductory segment of the second media content item to equalize the combined length of the ending segment and the introductory segment with the length of the interstitial. In another implementation, adjusting the overlap of the ending segment of the first media content item and the introductory segment of the second media content item with the interstitial may include overlapping (block 760) a portion of the ending segment of the first media content item and a portion of the introductory segment of the second media content item to equalize the combined length of the ending segment of the first media content item and the introductory segment of the second media content item with the length of the interstitial.

Figure 8:
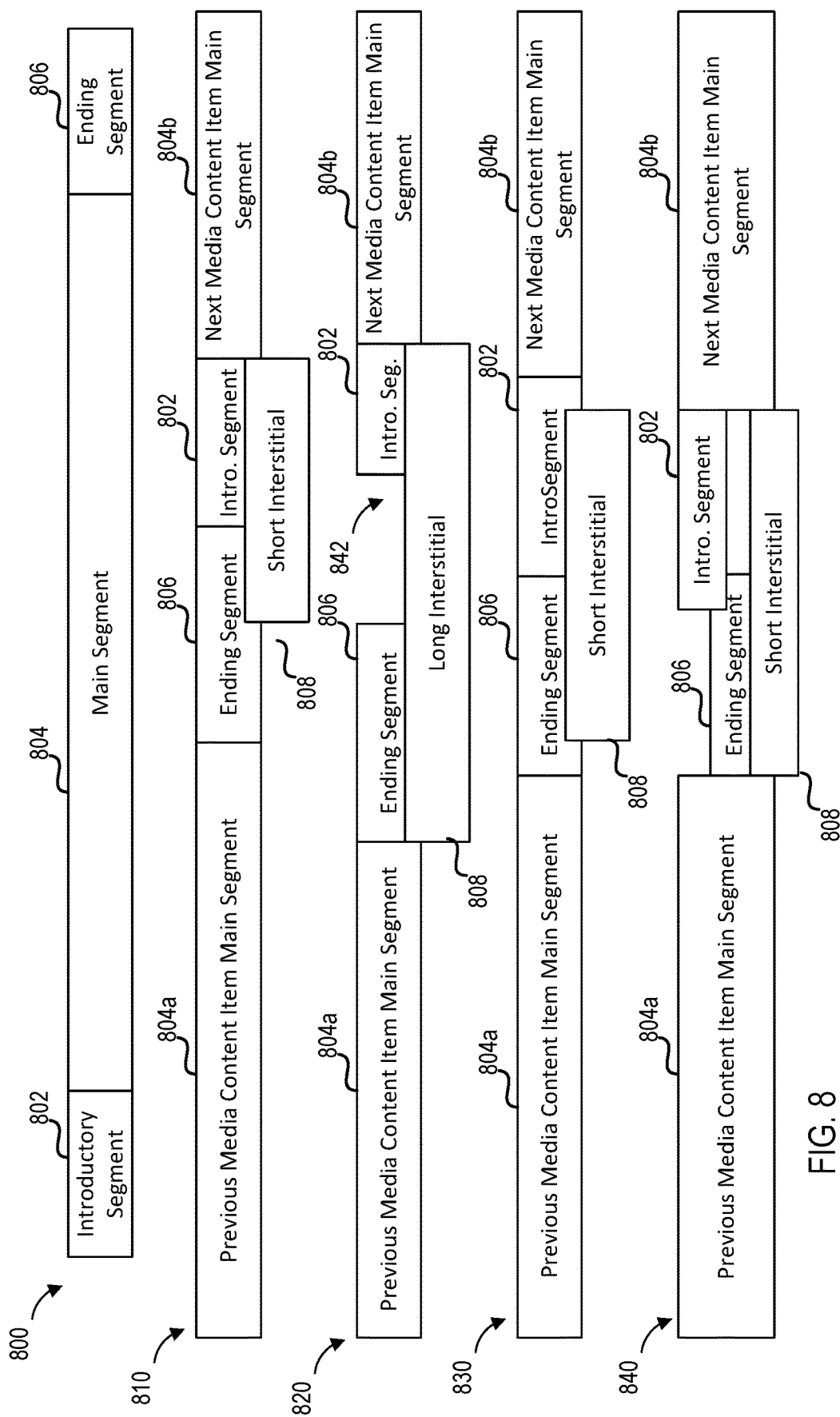
FIG. 8 depicts various examples of adding spacing between media content items and/or adjusting an overlap of segments of the media content items with an interstitial, according to an implementation.

FIG. 8 depicts various examples of adding spacing between media content items and/or adjusting an overlap of segments of the media content items with an interstitial, according to an implementation. Sample media content item 800 is depicted as including an introductory segment 802, a main segment 804, and an ending segment 806. Various examples of playlists 810, 820, 830, and 840 are also depicted. Each playlist includes a previous media content item main segment 804a with an ending segment 806, a next media content item main segment 804b with an introductory segment 802, and an interstitial 808 overlapping at least a portion of the ending segment 806 and at least a portion of the introductory segment 802. Just two media content items and one interstitial are depicted in each playlist for explanatory purposes. It should be noted that each playlist may include many more media content items 800 and interstitials 808.

In playlist 820, the content sharing platform 120 and/or the playlist generation system 140 may determine that the length of the interstitial 808 is less than the combined length of the ending segment 806 and the introductory segment 802. Further, a determination may be made that half of the length of the interstitial 808 exceeds the entire length of the introductory segment 802. As such, the interstitial 808 may be overlapped with an initial portion of the ending segment 806 (the initial portion being smaller than the entire ending segment 806) of the first media content item and the entire introductory segment 802 of the second media content item. Thus, playback of the interstitial may begin roughly halfway through the ending segment 806 and end at the same time the introductory segment 802 ends.

In playlist 820, the content sharing platform 120 and/or the playlist generation system 140 may determine that the length of the interstitial 808 exceeds the combined length of the ending segment 806 and the introductory segment 802. As such, spacing 842 may be added between the ending segment 806 and the introductory segment 802. The spacing may be determined by subtracting the combined length of the ending segment 806 and the introductory segment 802 from the length of the interstitial 808. As depicted, the full length of the interstitial may be fit in between the previous media content item main segment 804a and the next media content item main segment 804b.

In playlist 830, the content sharing platform 120 and/or the playlist generation system 140 may determine that the length of the interstitial 808 is less than the combined length of the ending segment 806 and the introductory segment 802. As such, the interstitial is overlapped over a first portion of the ending segment 806 of the first media content item and a second portion of the introductory segment 802 of the second media content item. The first portion of the ending segment of the first media content item and the second portion of the introductory segment of the second media content item may have the same length and the interstitial may be centered over the ending segment 806 and the introductory segment 802.

In playlist 840, the content sharing platform 120 and/or the playlist generation system 140 may determine that the length of the interstitial 808 is less than the combined length of the ending segment 806 and the introductory segment 802. As such, a portion of the ending segment 806 of the first media content item is overlapped with a portion of the introductory segment 802 of the second media content item to equalize the combined length of the ending segment 806 of the first media content item and the introductory segment 802 of the second media content item with the length of the interstitial 808.

Figure 9:
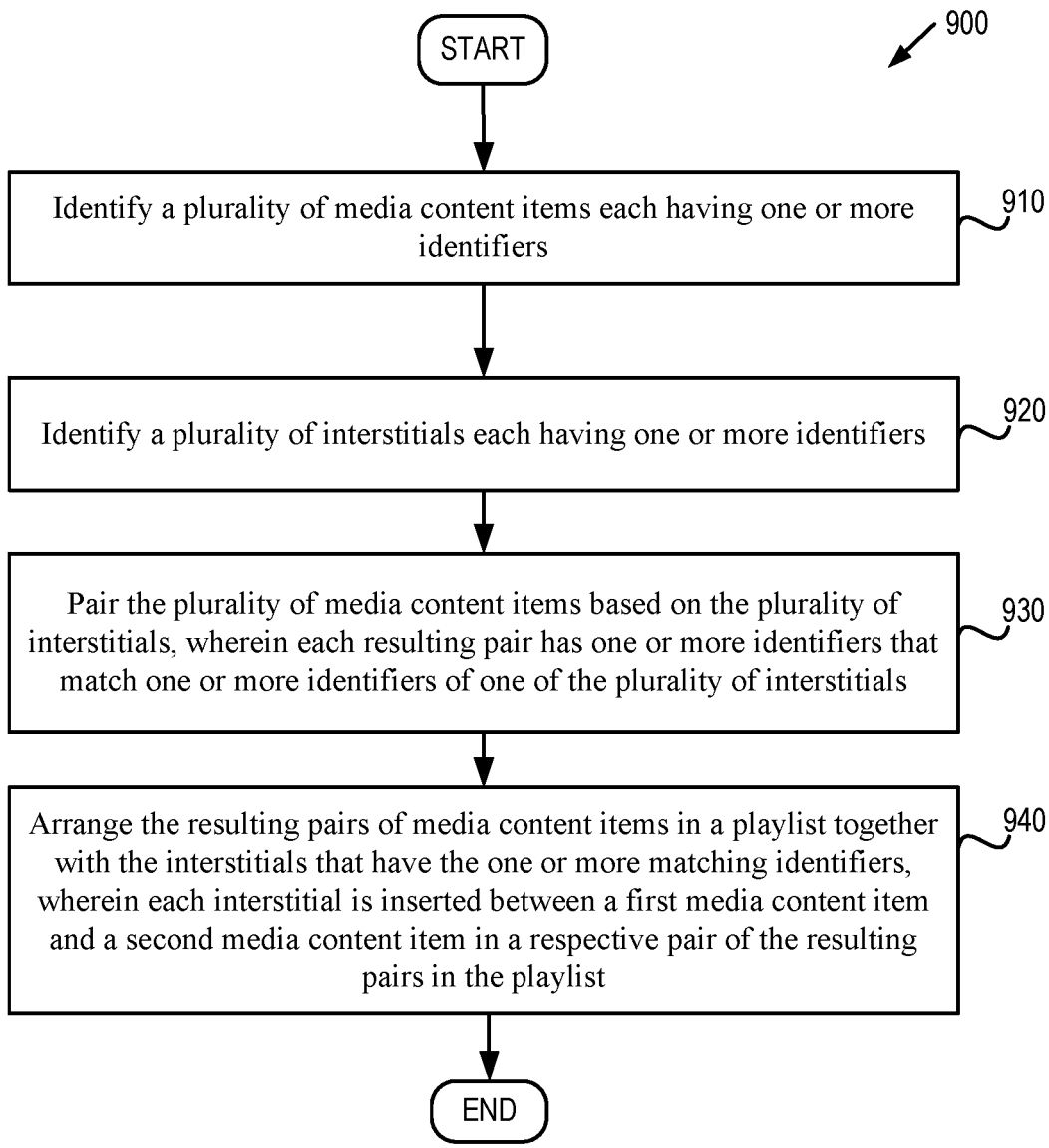
FIG. 9 is a flow diagram of an example method for arranging pairs of media content items in a playlist together with an interstitial that has one or more matching identifiers, according to an implementation.

FIG. 9 is a flow diagram of an example method 900 for arranging pairs of media content items in a playlist together with an interstitial that has one or more matching identifiers, according to an implementation. Method 900 may be performed in the same or a similar manner as described above in regards to methods 600 and 700. Method 900 may be performed by the content sharing platform 120 and/or the playlist generation system 140. Method 900 may begin at block 910.

At block 910, processing logic may identify a number of media content items for a playlist. The number of media content items may each have one or more identifiers. The media content items may be stored in the data store 106. The identifiers may relate to represented entities (e.g., artist ID, producer ID, etc.), to content of the media content items and the interstitials (e.g., genre ID, topic ID, etc.), or to other properties/characteristics of the media content items and the interstitials (e.g., channel ID, video ID, album ID, etc.). The identifiers may be metadata tags associated with each media content items. For example, one media content item may be a music video and include numerous identifiers for artist ID, video ID, album ID, genre ID, etc.

At block 920, processing logic may identify a number of interstitials for the playlist. The number of interstitials may each have one or more identifiers. The identifiers may be identified in the data store 106. The identifiers may relate to represented entities (e.g., artist ID, producer ID, etc.), to content of the media content items and the interstitials (e.g., genre ID, topic ID, etc.), or to other properties/characteristics of the media content items and the interstitials (e.g., channel ID, video ID, album ID, etc.). The identifiers may be metadata tags associated with each interstitial. For example, one interstitial may be a trivia tidbit about the music video and include numerous identifiers for artist ID, video ID, album ID, genre ID, etc. In some implementations, the interstitials may be trivia tidbits related to the identifiers, content, and/or characteristic of the media content items. The trivia elements may include audio, text, images, and/or videos. The interstitials may also include advertisements, voice over announcements, promotions, event notifications, and the like.

At block 930, processing logic may pair the number of media content items based on the number of interstitials. Each resulting pair of media content items may be related to one of the number of interstitials (e.g., each resulting pair has one or more identifiers that match one or more identifiers of one of the plurality of interstitials). Accordingly, the interstitial may provide information relevant to both media content items in a pair of media content items due to the matching identifiers. The pairs of media content items may be linked via the intersecting interstitials to form a large graph, where each of the nodes in the graph includes the media content items and the intersecting interstitials. FIG. 10A provides an illustrative example bellow.

At block 930, processing logic may arrange the resulting pairs of media content items in a playlist together with the interstitials that are each related to both media content items in a respective pair of the resulting pairs (e.g., have the one or more matching identifiers). Each interstitial is inserted between a first media content item and a second media content item in a respective pair of the resulting pairs in the playlist. Thus, the content of each interstitial may provide a transition from the first media content item in the respective pair of the resulting pairs to the second media content item in the respective pair of the resulting pairs. The transition provided by the content of each interstitial facilitates cohesiveness of content across the playlist, which may result in an enhanced listening/viewing experience for the user.

Further, in some implementations, processing logic may arrange the resulting pairs of media content items and the interstitials in the playlist based on a score of a frequency of occurrence of pairs of media content items having the one or more identifiers that match the one or more identifiers of one of the interstitials. For example, the processing logic may attempt each permutation of traversal paths through the graph including the media content items linked by the interstitials until a playlist is found that includes the highest total count of media content items and interstitials (e.g., highest score). In some implementations, the processing logic may stop searching for the playlist after a playlist is found by traversing the graph that includes a total count of media content items and interstitials above a threshold value (e.g., 5 videos with 4 intersecting interstitials). Further, in an implementation, once media content items and interstitials are used in a playlist, the processing logic may exclude those media content items and interstitials from the graph for subsequent traversals.

In some embodiments, certain media content items themselves may be weighted in the graph based on the user's affinity (e.g., a number of times the user has played the respective media content item, whether the user has selected a button indicting the user "likes" the respective media content item, etc.) to the media content item. In such cases, the score may be determined by the summed weight of each of the media content items instead of the total count of media content items and interstitials. Further, weights may be assigned to pairs and interstitials based on how narrow the matching identifiers are. For example, an interstitial that specifically relates to two particular videos in a pair of media content items may have a higher weighting than an interstitial that pertains to two artists or two genres.

In an implementation, the processing logic may maintain a history of inserted interstitials in the playlist. In response to a determination that the at least one identified interstitial has been inserted in the playlist in the past, the processing logic may insert a different interstitial that has the one or more identifiers that match the one or more identifiers of the pair of media content items in the playlist. Also, in an implementation, the interstitial (e.g., trivia tidbit) may overlap at least a portion of an ending segment of the first media content item and at least a portion of an introductory segment of the second media content item.

The generated playlist 122 may be sent to the media viewer 112a of the client device 110b. The media content items and interstitials may be presented to the user as described above with reference to FIGS. 3-5. For example, the media content items and the interstitial may be played at various times in the same media viewer 112. In another example, the media content items may be presented in a first media viewer and the interstitial may be presented in a second media viewer (e.g., within the first media player or proximate to the first media player). In background playback mode of streaming radio, the trivia tidbits may be heard by the user as audio interstitials without having to look at the client device. In other implementations, the interstitials may be presented as related videos (e.g., links or thumbnails) or auto-play videos.

Figure 10C:
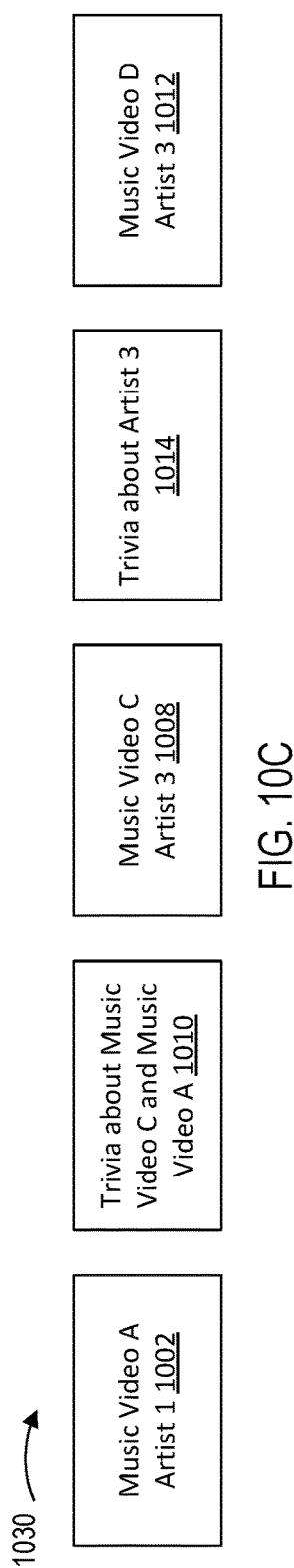
FIG. 10C depicts an example resulting playlist from a traversal of the graph of FIG. 10A, the playlist including two pairs of media content items intersected by two interstitials each having one or more matching identifiers to a respective pair, according to an implementation.
Figure 10D:
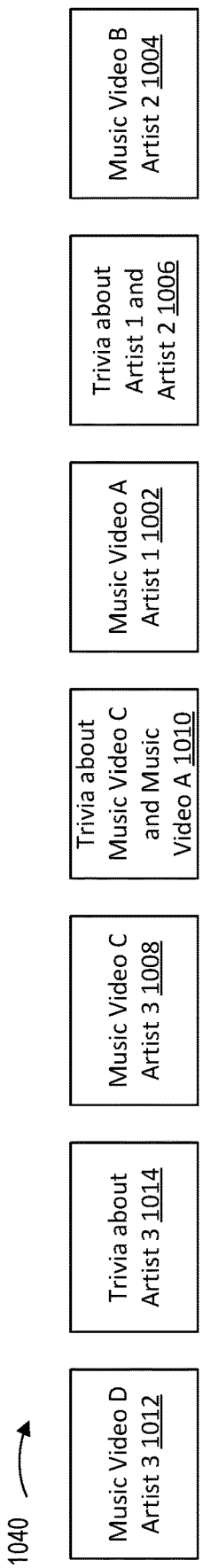
FIG. 10D depicts an example resulting playlist from a traversal of the graph of FIG. 10A, the playlist including three pairs of media content items intersected by three interstitials each having one or more matching identifiers to a respective pair, according to an implementation.

FIG. 10A depicts an example graph 1000 of media content item pairs linked by an interstitial having one or more matching identifiers, according to an implementation. FIG. 10B-10D depict example resulting playlists from traversing the graph in FIG. 10A.

As illustrated in FIG. 10A, the media content items are music videos and each interstitial is a trivia tidbit related to two of the music videos. For example, there are four music videos 1002, 1004, 1008, and 1012, each including two identifiers. The first music video 1002 includes a video ID ("A") and artist ID ("1"), the second music video 1004 includes a video ID ("B") and an artist ID ("2"), the third music video 1008 includes a video ID ("C") and an artist ID ("3"), and the fourth music video 1012 includes a video ID ("D") and an artist ID ("3").

Further, the graph 1000 includes three trivia interstitials 1006, 1010, and 1014. Each interstitial also includes one or more identifiers. The first trivia interstitial 1006 includes a first artist ID ("1") and a second artist ID ("2"), the second trivia interstitial 1010 includes a first video ID ("C") and a second video ID ("A"), and the third trivia interstitial 1014 includes an artist ID ("3").

The content sharing platform 120 and/or the playlist generation system 140 may use processing logic to pair the plurality of media content items 1002, 1004, 1008, and 1012 based on the trivia interstitials 1006, 1010, and 1014. Each resulting pair may have one or more identifiers that match one or more identifiers of one of the plurality of interstitials. For example, the processing logic may pair the first music video 1002 and the second music video 1004 via the first trivia interstitial 1006, because the first music video 1002 includes the identifier for artist 1, the second music video 1004 includes the identifier for artist 2, and the first trivia interstitial 1006 includes identifiers for both artist 1 and artist 2. The processing logic may pair the first music video 1002 with the third music video 1008 via the second trivia interstitial 1010, because the first music video 1002 includes the identifier for video A, the second music video 1008 includes the identifier for video C, and the second interstitial 1010 includes the identifier for video A and video C. Additionally, the processing logic may pair the third music video 1008 with the fourth music video 1012 via the third trivia interstitial 1014, because the third music video 1008 includes the identifier for artist 3, the fourth music video 1012 includes the identifier for artist 3, and the third interstitial 1014 includes the identifier for artist 3. Pairing the media content items 1002, 1004, 1008, and 1012 by linking them with the trivia interstitials 1006, 1010, and 1014 may foi in the graph 1000. As discussed above, the trivia interstitials provide information related to the content of each of the music videos in the resulting pairs.

FIG. 10B depicts an example resulting playlist 1020 from a traversal of the graph 1000 of FIG. 10A, the playlist including one pair of media content items intersected by one interstitial having one or more matching identifiers, according to an implementation. The playlist 1020 includes a total count of three nodes (two music videos 1002 and 1004, and one interstitial 1006). The processing logic may initially select to arrange the pair of music videos (1002 and 1004)

that include the first interstitial 1006 having identifiers that match the pair of music videos (e.g., artist 1 for music video 1002 and artist 2 for music video 1004). However, there are no additional pairs that link with the second music video 1004 via another interstitial, and thus, the traversal may end. The processing logic may assign a low score to the playlist 1020 due to the low total count of media content items and interstitials. In some implementations, the processing logic may discard the playlist 1020 since a threshold number (e.g., 5) of media content items and interstitials was not satisfied.

FIG. 10C depicts an example resulting playlist 1030 from a traversal of the graph 1000 of FIG. 10A, the playlist including two pairs of media content items (1002 and 1008, and 1008 and 1012) intersected by two interstitials (1010, 1014) each having one or more matching identifiers to a respective pair, according to an implementation. The playlist 1030 includes a total count of five nodes (three music videos 1002, 1008, and 1012, and two interstitials 1010 and 1014). The processing logic may initially select to arrange a first pair of music videos (1002 and 1008) that include the second interstitial 1010 having identifiers that match the pair of music videos (e.g., video A for music video 1002 and video C for music video 1008). The processing logic may then continue traversing the graph 1000 via the interstitial 1014 to arrange a second pair of music videos (1008 and 1012). The interstitial 1014 includes the artist 3 identifier that matches with the same identifier of music video 1008 and 1012. The processing logic may assign a medium score to the playlist 1030 due to having a higher total count than playlist 1020 but still not an optimized total count of media content items and interstitials.

FIG. 10D depicts an example resulting playlist 1040 from a traversal of the graph 1000 of FIG. 10A, the playlist 1040 including three pairs of media content items (1012 and 1008, 1008 and 1002, and 1002 and 1004) intersected by three interstitials (1014, 1010, and 1006) each having one or more matching identifiers to a respective pair, according to an implementation. The playlist 1040 includes each node in the graph 1000 for a total count of seven nodes (four music videos 1002, 1008, 1010, and 1012, and three interstitials 1006, 1010, and 1014). The processing logic may initially select to arrange a pair of music videos (1012 and 1008) that include the third interstitial 1014 having identifiers that match the pair of music videos (e.g., artist 3 for music video 1012 and artist 3 for music video 1008). The processing logic may then continue traversing the graph 1000 via the second interstitial 1010 to arrange a second pair of music videos (1008 and 1002) next. The interstitial 1010 includes the video C identifier that matches with the same identifier of music video 1008 and the video A identifier that matches the same identifier of music video 1002. The processing logic may then continue traversing the graph 1000 via the first interstitial 1006 to arrange a third pair of music videos (1002 and 1004). The interstitial 1006 includes the artist 1 identifier that matches with the same identifier of music video 1002 and the artist 2 identifier that matches the same identifier of music video 1004.

The processing logic may assign a highest score to the playlist 1040 due to generating a playlist that includes the highest frequency possible of occurrence of pairs of media content items having the one or more identifiers that match the one or more identifiers of one of the interstitials in the graph 1000. As such, the processing logic may select the playlist 1040 to send to the media viewer of the client devices. It should be noted that the media content items 1002, 1004, 1008, and/or 1012 may be weighted according to the user's affinity to the media content items and the scoring may be based on a total summed score of the nodes in a resulting playlist.

Figure 11:
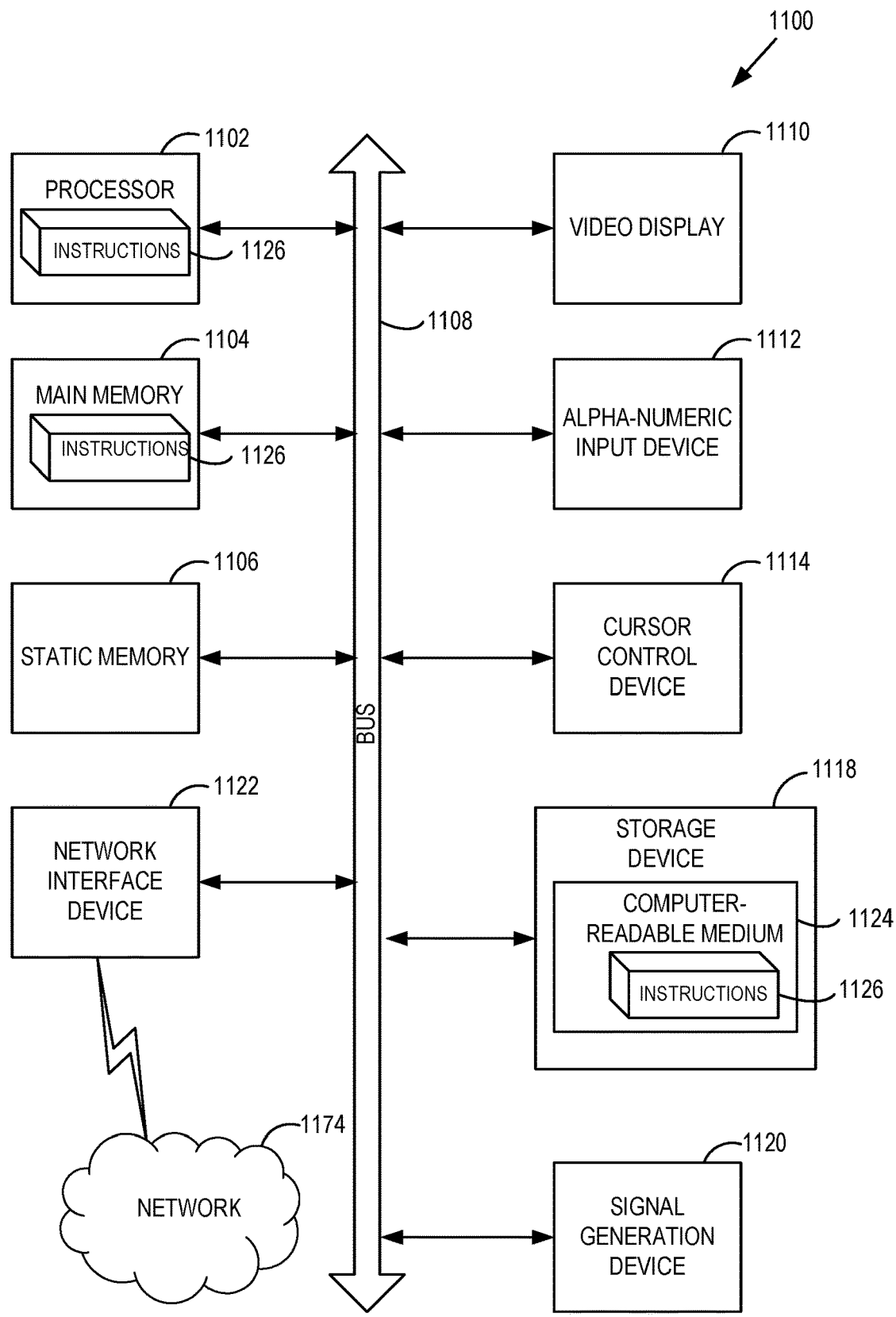
FIG. 11 depicts a block diagram of an illustrative computer system operating in accordance with aspects and implementations of the present disclosure.

FIG. 11 illustrates a diagrammatic representation of a machine in the exemplary form of a computer system 1100 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a network connected television, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the teen "machine" shall also be taken to include any collection of machines that individually or jointly execute a set (or multiple sets) of instructions to perform any one or more of the methodologies discussed herein. In one implementation, computer system 1100 may be representative of a server, such as server 130, executing playlist generation system 140, as described with respect to FIGS. 1-10. In another implementation, computer system 1100 may be representative of a client device, such as client device 110, or a content sharing platform, such as content sharing platform 120, as described with respect to FIGS. 1-10.

The exemplary computer system 1100 includes a processing device 1102, a main memory 1104 (e.g., read-only memory (ROM), flash memory, dynamic random access memory (DRAM) (such as synchronous DRAM (SDRAM) or Rambus DRAM (RDRAM), etc.), a static memory 1106 (e.g., flash memory, static random access memory (SRAM), etc.), and a data storage device 1118, which communicate with each other via a bus 1108. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 602 is configured to execute instructions (e.g., processing logic) 1126 for performing the operations and steps discussed herein.

The computer system 1100 may further include a network interface device 1122. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1120 (e.g., a speaker).

The data storage device 1118 may include a computer-readable storage medium 1124 (also referred to as a machine-readable storage medium), on which is stored one or more set of instructions 1126 (e.g., software) embodying any one or more of the methodologies of functions described herein. The instructions 1126 may also reside, completely or at least partially, within the main memory 1104 and/or within the processing device 1102 during execution thereof by the computer system 1100; the main memory 1104 and the processing device 1102 also constituting machine-readable storage media. The instructions 1126 may further be transmitted or received over a network 1174 via the network interface device 1122.

The computer-readable storage medium 624 may also be used to store instructions to perform a method for providing personalized music recommendations, as described herein. While the computer-readable storage medium 1124 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
   identifying a plurality of media content items for a playlist, each of the plurality of media content items having an introductory segment, one or more main segments, and an ending segment;
   determining a length of an ending segment of a first media content item of the plurality of media content items and a length of an introductory segment of a second media content item of the plurality of media content items;
   selecting an interstitial to be added to the playlist between one or more main segments of the first media content item and one or more main segments of the second media content item, wherein a length of the interstitial exceeds a combined length of the ending segment of the first media content item and the introductory segment of the second media content item;
   adding a spacing between the ending segment of the first media content item and the introductory segment of the second media content item, wherein a size of the spacing is based on a difference between the combined length of the ending segment of the first media content item and the introductory segment of the second media content item and the length of the interstitial; and
   combining the interstitial with the first media content item and the second media content time by inserting the interstitial in the playlist between the one or more main segments of the first media content item and the one or more main segments of the second media content item based on the spacing, wherein the inserted interstitial is combined with at least a portion of the ending segment of the first media content item and at least a portion of the introductory segment of the second media content item.

2. The method of claim 1, wherein the size of the spacing is equal to a delta amount of time determined by subtracting the combined length of the ending segment of the first media content item and the introductory segment of the second media content item from the length of the interstitial.

3. The method of claim 1, further comprising:
   determining that a length of a second interstitial is less than a combined length of an ending segment of the second media content item and an introductory segment of a third media content item of the plurality of media content items; and
   adjusting an overlap, with the second interstitial, of the ending segment of the second media content item and the introductory segment of the third media content item.

4. The method of claim 3, wherein adjusting the overlap, with the second interstitial, of the ending segment of the second media content item and the introductory segment of the third media content item comprises:
   responsive to a determination that half of the length of the second interstitial exceeds the length of the introductory segment of the third media content item, overlapping, with the second interstitial, an initial portion of the ending segment of the second media content item and the entire introductory segment of the third media content item.

5. The method of claim 3, wherein adjusting the overlap, with the second interstitial, of the ending segment of the second media content item and the introductory segment of the third media content item comprises:
   responsive to a determination that half of the length of the second interstitial exceeds the length of the ending segment of the second media content item, overlapping, with the second interstitial, the entire ending segment of the second media content item and an initial portion of the introductory segment of the third media content item.

6. The method of claim 3, wherein adjusting the overlap, with the second interstitial, of the ending segment of the second media content item and the introductory segment of the third media content item comprises, overlapping, with the second interstitial, a first portion of the ending segment of the second media content item and a second portion of the introductory segment of the third media content item, the first portion of the ending segment of the second media content item and the second portion of the introductory segment of the third media content item having the same length.

7. The method of claim 3, wherein adjusting the overlap comprises shrinking at least one of the ending segment of the second media content item or the introductory segment of the third media content item to equalize the combined length of the ending segment of the second media content item and the introductory segment of the third media content item with the length of the second interstitial.

8. The method of claim 3, wherein adjusting the overlap comprises overlapping a portion of the ending segment of the second media content item with a portion of the introductory segment of the third media content item to equalize the combined length of the ending segment of the second media content item and the introductory segment of the third media content item with the length of the second interstitial.

9. The method of claim 8, wherein the overlapping portion of the ending segment of the second media content item and the overlapping portion of the introductory segment of the third media content item is faded in during playback.

10. The method of claim 1, wherein the plurality of interstitial s comprise one or more of an announcement of the media content item that is playing next in the playlist, a notification of messages received while the first media content item played, and a trivia element that relates to both the first media content item and the second media content item.

11. The method of claim 1, wherein the plurality of media content items comprise audio and video.

12. The method of claim 1, wherein the plurality of media content items in the playlist are played in a first media player and the interstitial in the playlist is played in a second media player proximate to the first media player.

13. The method of claim 1, further comprising:
transmitting the playlist of the media content items and the interstitial over a network to at least one media player of a client device.

14. The method of claim 1, further comprising using timestamps to determine the lengths of the ending segment of the first media content item and the introductory segment of the second media content item.

15. The method of claim 1, selecting one of a plurality of playlists, which comprises the playlist, based on at least one of a total count of media content items or at least one interstitial in each of the plurality of playlists.

16. A non-transitory computer readable storage medium comprising instructions that, when executed by a processor, cause the processor to:
identify a plurality of media content items for a playlist, each of the plurality of media content items having an introductory segment, one or more main segments, and an ending segment;
determine a length of an ending segment of a first media content item of the plurality of media content items and a length of an introductory segment of a second media content item of the plurality of media content items;
select an interstitial to be added to the playlist between one or more main segments of the first media content item and one or more main segments of the second media content item, wherein a length of the interstitial exceeds a combined length of the ending segment of the first media content item and the introductory segment of the second media content item;
add a spacing between the ending segment of the first media content item and the introductory segment of the second media content item, wherein a size of the spacing is based on a difference between the combined length of the ending segment of the first media content item and the introductory segment of the second media content item and the length of the interstitial; and
combining the interstitial with the first media content item and the second media content time by inserting the interstitial in the playlist between the one or more main segments of the first media content item and the one or more main segments of the second media content item based on the spacing, wherein the inserted interstitial is combined with at least a portion of the ending segment of the first media content item and at least a portion of the introductory segment of the second media content item.

17. The non-transitory computer readable storage medium of claim 16, wherein the size of the spacing is equal to a delta amount of time determined by subtracting the combined length of the ending segment of the first media content item and the introductory segment of the second media content item from the length of the interstitial.

18. The non-transitory computer readable storage medium of claim 16, the processor is further to:
determine that a length of a second interstitial is less than a combined length of an ending segment of the second media content item and an introductory segment of a third media content item of the plurality of media content items; and
adjust an overlap, with the second interstitial, of the ending segment of the second media content item and the introductory segment of the third media content item.

19. A system, comprising:
a memory device;
a processing device operatively coupled to the memory device, the processing device to:
identify a plurality of media content items for a playlist, each of the plurality of media content items having an introductory segment, one or more main segments, and an ending segment;
determine a length of an ending segment of a first media content item of the plurality of media content items and a length of an introductory segment of a second media content item of the plurality of media content items;
select an interstitial to be added to the playlist between one or more main segments of the first media content item and one or more main segments of the second media content item, wherein a length of the interstitial exceeds a combined length of the ending segment of the first media content item and the introductory segment of the second media content item;
add a spacing between the ending segment of the first media content item and the introductory segment of the second media item, wherein a size of the spacing is based on a difference between the combined length of the ending segment of the first media content item and the introductory segment of the second media content item and the length of the interstitial; and combine the interstitial with the first media content item and the second media content time by inserting the interstitial in the playlist between the one or more main segments of the first media content item and the one or more main segments of the second media content item based on the spacing, wherein the inserted interstitial is combined with at least a portion of the ending segment of the first media content item and at least a portion of the introductory segment of the second media content item.

20. The system of claim 19, wherein the size of the spacing is equal to a delta amount of time determined by subtracting the combined length of the ending segment of the first media content item and the introductory segment of the second media content item from the length of the interstitial.

* * * * *